(12) United States Patent
Aratani et al.

(10) Patent No.: US 6,538,675 B2
(45) Date of Patent: *Mar. 25, 2003

(54) DISPLAY CONTROL APPARATUS AND DISPLAY CONTROL SYSTEM FOR SWITCHING CONTROL OF TWO POSITION INDICATION MARKS

(75) Inventors: Shuntaro Aratani, Machida (JP); Katsuhiro Miyamoto, Isehara (JP); Yuichi Matsumoto, Hiratsuka (JP); Hideaki Yui, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/292,015

(22) Filed: Apr. 15, 1999

(65) Prior Publication Data
US 2003/0020757 A1 Jan. 30, 2003

(30) Foreign Application Priority Data
Apr. 17, 1998 (JP) ............................................. 10-124325
Apr. 17, 1998 (JP) ............................................. 10-124327

(51) Int. Cl.$^7$ ................................................. G06F 3/00
(52) U.S. Cl. ....................... 345/856; 345/157; 345/642; 345/764; 345/769
(58) Field of Search ................................ 345/856, 858, 345/764, 769, 770, 863, 619, 642, 700, 157, 162

(56) References Cited

U.S. PATENT DOCUMENTS

| | | | |
|---|---|---|---|
| 5,191,644 A | * 3/1993 | Takeda | 345/158 |
| 5,297,254 A | * 3/1994 | Arai et al. | 395/161 |
| 5,353,041 A | 10/1994 | Miyamoto et al. | 345/97 |
| 5,408,247 A | 4/1995 | Enomoto et al. | 345/100 |
| 5,420,603 A | 5/1995 | Tsuboyama et al. | 345/87 |
| 5,481,274 A | 1/1996 | Aratani et al. | 345/98 |
| 5,499,327 A | * 3/1996 | Satoh | 345/135 |
| 5,640,496 A | * 6/1997 | Hardy et al. | 345/121 |
| 5,640,522 A | * 6/1997 | Warrin | 345/804 |
| 5,815,135 A | 9/1998 | Yui et al. | 345/97 |
| 5,828,372 A | * 10/1998 | Kameda | 345/753 |
| 5,912,713 A | 6/1999 | Tsunoda et al. | 348/540 |
| 5,931,908 A | * 8/1999 | Gerba et al. | 709/219 |
| 6,229,536 B1 | * 5/2001 | Alexander et al. | 345/781 |

* cited by examiner

Primary Examiner—Ba Huynh
Assistant Examiner—Cuong T. Thai
(74) Attorney, Agent, or Firm—Fitzpatrick, Cella, Harper & Scinto

(57) ABSTRACT

A display system receives image data from a plurality of image sources and displays the received image data on a display unit. The display system includes an input unit for inputting a control signal supplied from an input/output unit, a controller for controlling an image to be displayed on the display unit in accordance with the control signal input from the input unit, and an image selection unit for selecting a desired image from images displayed on the display unit. A switching unit switches an image to be controlled by the controller in accordance with the image selected by the image selection unit.

25 Claims, 21 Drawing Sheets

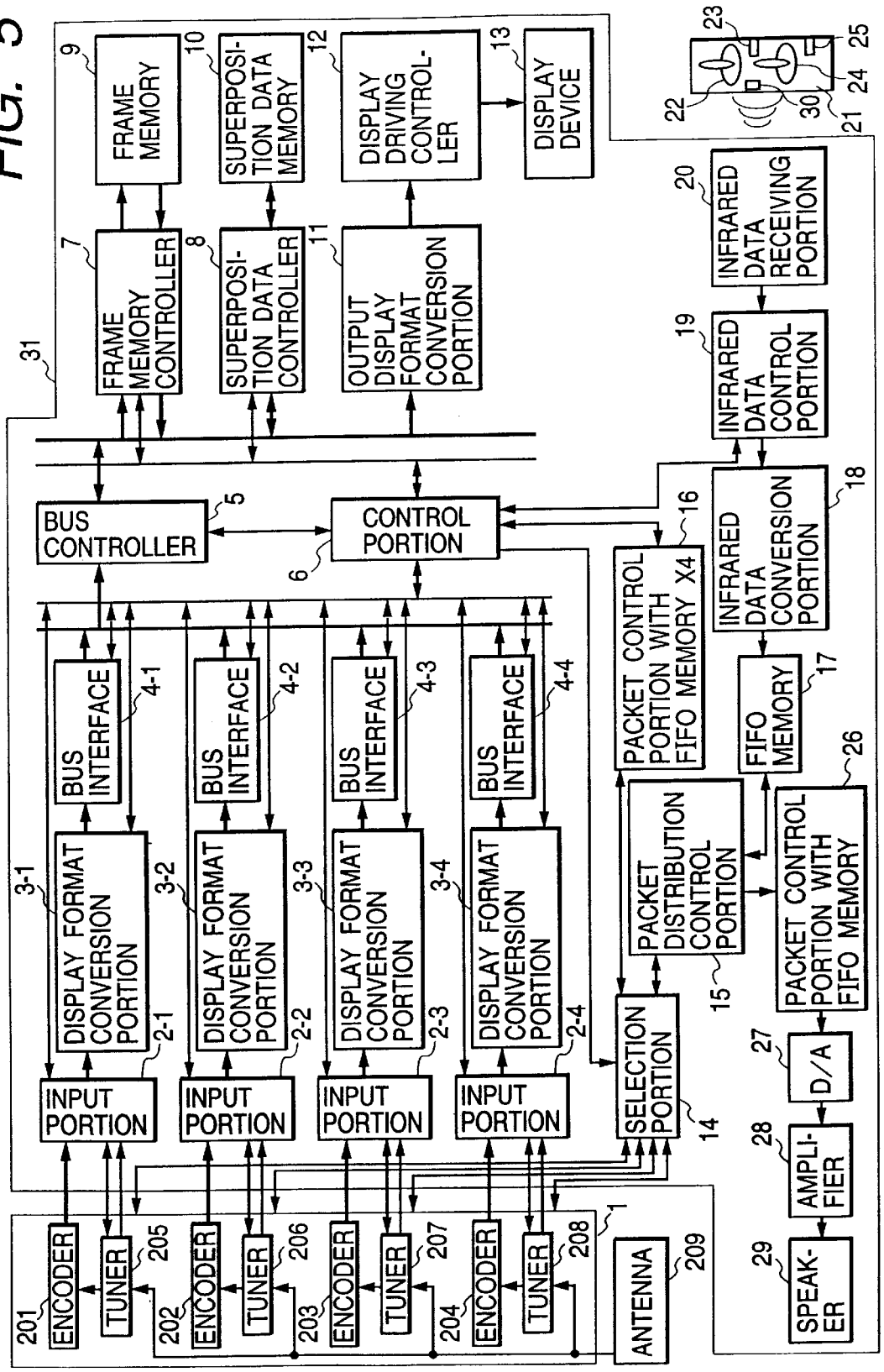

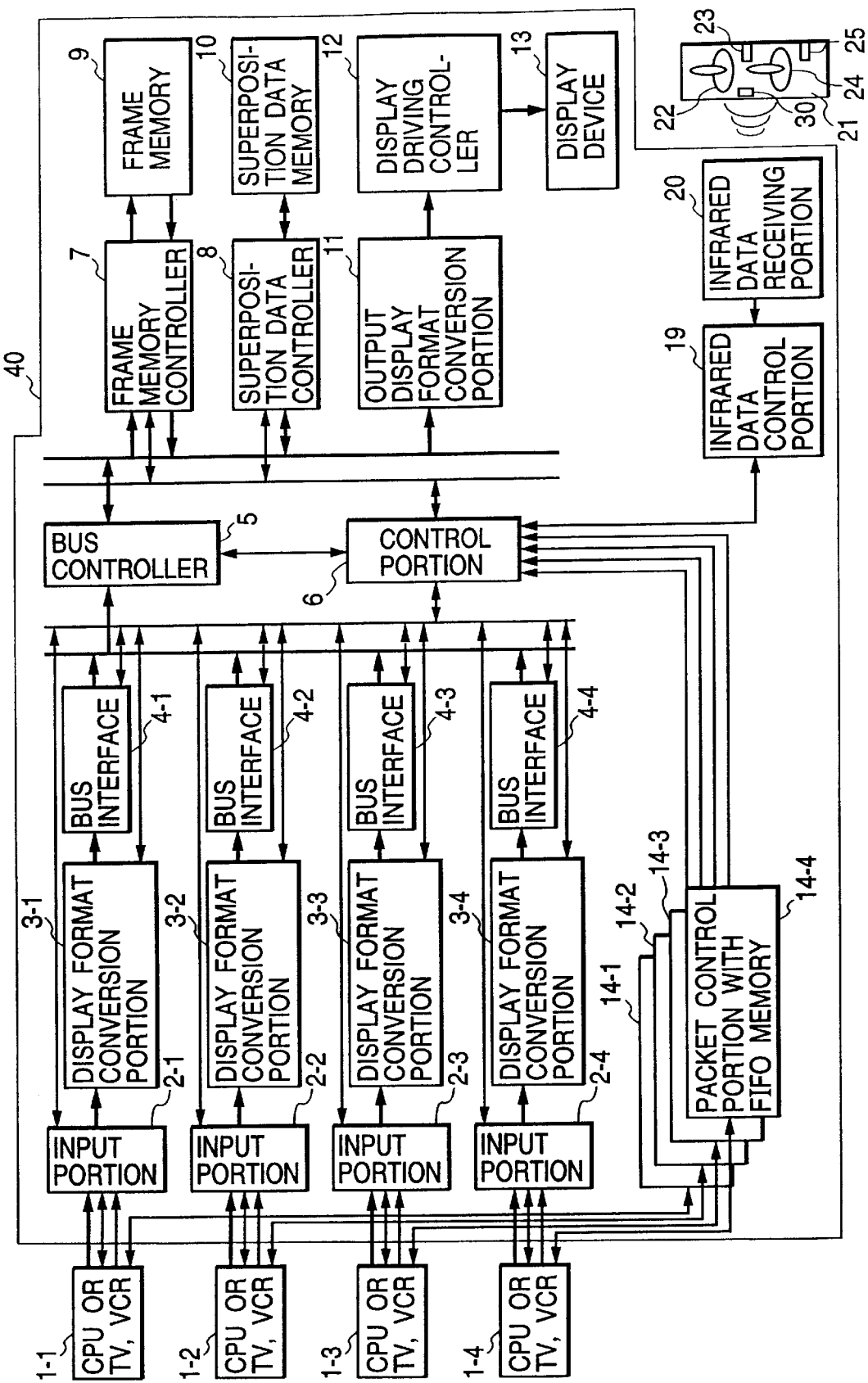

DISPLAY CONTROL APPARATUS AND DISPLAY CONTROL SYSTEM FOR SWITCHING CONTROL OF TWO POSITION INDICATION MARKS

BACKGROUND OF THE INVENTION

1. Field of the Invention

The present invention relates to a display control apparatus and a display system, and more particularly to a display control apparatus for controlling the multiwindow display of data input from a plurality of personal computers and to a display system using such display control apparatus.

2. Related Background Art

Images supplied from desk-top type personal computers (desk-top PC), note type personal computers (note PC) and the like are often displayed on a large display device such as a liquid crystal projector and a plasma display for presentations of various types. Note PC's are prevailing as personal business tools because they are light and inexpensive. Each participant in a meeting (a conference) has in many cases a note PC to check data therein or write the minutes of proceedings of the meeting.

A conventional large display device is connected to PC in one-to-one correspondence. Therefore, if a plurality of persons give a presentation, it is necessary to change the connection of PC to the display device or copy a file such as presentation materials to another PC each time a different person gives a presentation. However, the work of a connection change is cumbersome and if a file is to be copied to a different PC, many inconveniences occur such as inability of immediately displaying data because of different applications and versions or the like. In such cases, an advance of the meeting is often interrupted.

Under the above-described circumstances, an image display system is desired to have a function of displaying image information supplied from a plurality of PC's (image sources) in a switched manner or at the same time while a meeting advances, a function of displaying the minutes of proceedings written by another PC for the confirmation by all participants.

SUMMARY OF THE INVENTION

The present invention has been made to solve the above-described problems associated with conventional techniques and provide a display system capable of controlling a display of images input from a plurality of image sources by using a common input/output device.

In order to achieve the above object of the invention, a display system for receiving image data from a plurality of image sources and displaying the received image data on a display unit, comprises: input means for inputting a control signal supplied from an input/output unit; control means for controlling an image to be displayed on the display unit in accordance with the control signal input from the input means; image selection means for selecting a desired image from images displayed on the display unit; and switching means for switching an image to be controlled by the control means in accordance with the image selected by the image selection means.

Another display system of the invention for receiving image data from a plurality of image sources and displaying the received image data on a display unit, comprises: scale varying means for varying a display scale of each image to be displayed on the display unit; a memory structured hierarchically for storing each image to be displayed on the display unit at each hierarchical level assigned with a priority order; and display style setting means for setting a display style of each image to be displayed on the display unit, in accordance with a scaling factor of the image set by the scale varying means and the priority order of the image stored in the memory.

It is another object of the invention to solve the above-described problems and provide a display control apparatus and a display system capable of easily controlling the display of images to be displayed on a conference/presentation display device by using at least one image display apparatus.

In order to achieve the above object of the invention, a display control apparatus having user information input means and connected via communications means to at least one image display apparatus for outputting image information, comprises: image input means for receiving at least one piece of image information output from at least one image display apparatus; a display device for displaying at least one piece of received image information; first overlay display means for displaying in-an overlay manner a first position indication mark on the display device in order to select one piece of image information from at least one piece of image information displayed on the display device; second overlay display means for displaying in an overlay manner a second position indication mark on the display device; and control means for determining a display position of the second position indication mark to be displayed by the second overlay display means in accordance with the user information supplied via the communications means from the user information input means, relative to the one piece of the image information selected by the first position indication mark displayed by the first overlay display means, and controlling an operation of the second overlay display means in accordance with the determined display position.

BRIEF DESCRIPTION OF THE DRAWINGS

FIG. 5 is a block diagram showing the structure of a display system according to a second embodiment of the invention.

FIG. 6 is a block diagram showing the structure of a display system according to a third embodiment of the invention.

FIG. 7A illustrates a control by the image source pointer, and FIG. 7B illustrates a control by the main pointer.

FIG. 8A illustrates a selection of a window of an image source 1-1 with the main pointer, and FIG. 8B illustrates a selection of a window of an image source 1-2 with the main pointer.

FIG. 11A illustrates a selection of a window of an image source 1-1 with a main pointer, and FIG. 11B illustrates a selection of a clip board icon Y1 with a main pointer.

FIG. 12A illustrates a selection of a window of an image source 1-1 with a main pointer, and FIG. 12B illustrates a selection of a window of an image source 1-2 with the main pointer.

DETAILED DESCRIPTION OF THE PREFERRED EMBODIMENTS (First Embodiment)

Figure 1:
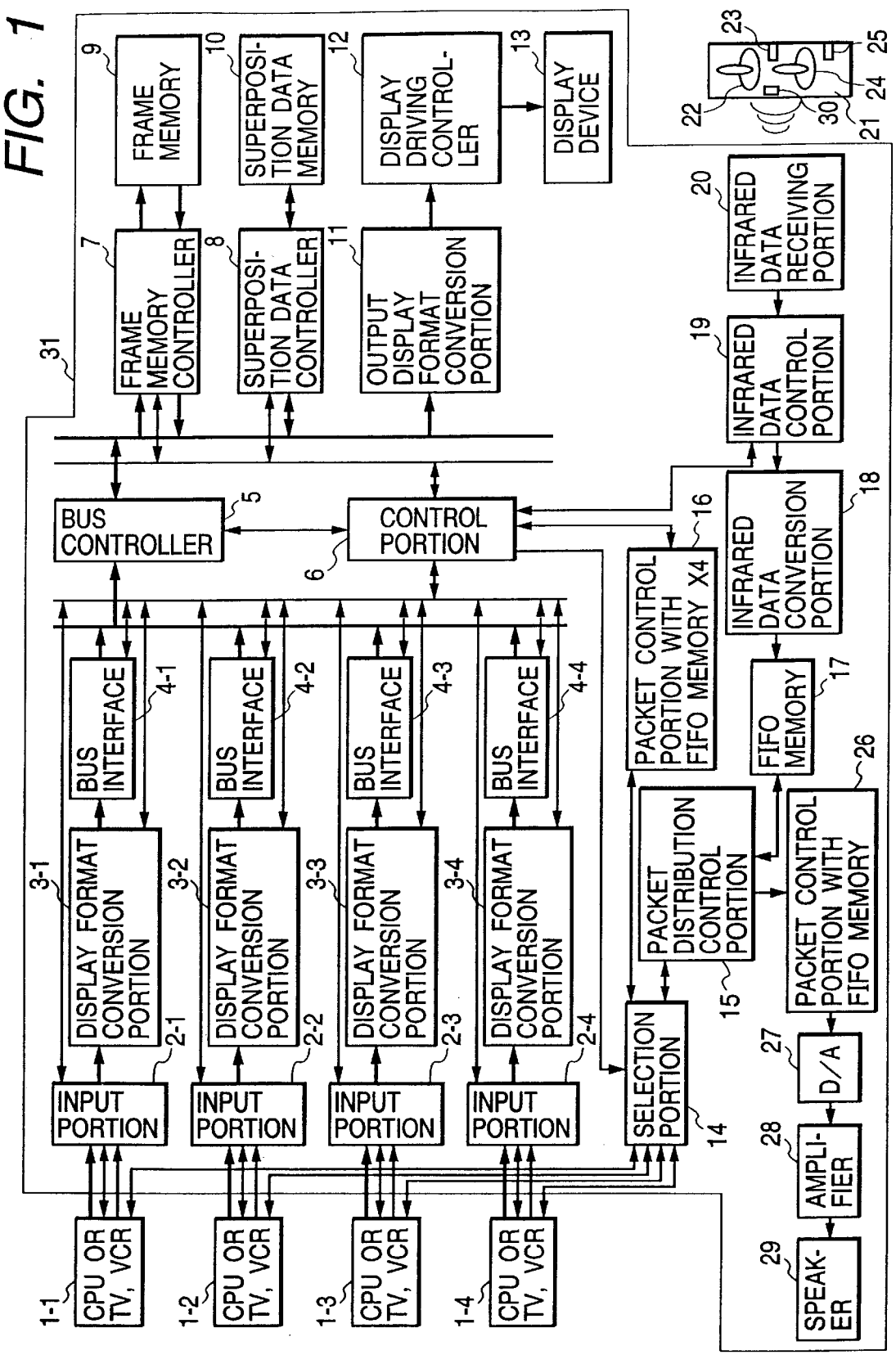
FIG. 1 is a block diagram showing the structure of a display system according to a first embodiment of the invention.

FIG. 1 is a block diagram showing the structure of a display system according to the first embodiment of the invention.

[Description of Each Component]

Each block shown in FIG. 1 will be described. In this embodiment, information supplied from four independent image sources (such as note PC) is displayed on one monitor and an input/output device of each image source, such as a mouse, a keyboard, a remote controller and a speaker, is controlled in cooperation with image data displayed on the monitor. The number of image sources may be larger than or smaller than four.

Reference numeral 31 represents a display system. Reference numerals 1-1, 1-2, 1-3 and 1-4 represent sources of image signals (hereinafter called "image source 1") which may be a personal computer, a work station, a digital television, or a camcorder (video camera). In this embodiment, four image sources are used. Reference numerals 2-1, 2-2, 2-3 and 2-4 represent an input portion for receiving image data output from each image source 1 (hereinafter called "input portion 2". Each input portion 2 has: an A/D converter and a PLL (phase locked loop) circuit for sampling image data if the input portion receives analog image data; a decoder and a differential buffer if the input portion receives digital image data such as LVDS (low voltage differential signalling); or an encoder for encoding a composite signal into R, G and B signals if the input portion receives television or camcorder composite signals. Each input portion 2 receives from the image source 1 not only the image data but also control signals to be used for reception of image data, such as a horizontal sync signal for line synchronization, a vertical sync signal for frame or field synchronization, a clock signal for sampling each pixel, and a display enable signal indicating a transfer period of effective image data. Each input portion 2 receives image data at an independent timing from other input portions. The input portion 2 has serial communication means to be described later for communications with the image source 1.

Reference numerals 3-1, 3-2, 3-3 and 3-4 represent a display format conversion portion (hereinafter called a "display format conversion portion 3") for converting a display format (the numbers of display lines, dots and colors) of image data received at the input portion 2, under the control of a control portion 6. Reference numerals 4-1, 4-2, 4-3 and 4-4 represent bus interface portions for inputting independent four image data sets to one common bus. Reference numeral 5 represents a bus controller for receiving image data output from each bus interface portion 4 and image data output from a frame memory controller 7 and a superposition data controller 8 and for arbitrating transfer of the image data in accordance with a priority order upon reception of a transfer request from these controllers.

Reference numeral 6 represents a control portion for controlling the entirety of the display system. The control portion 6 has a CPU with a computing ability, a RAM for temporarily storing data, a ROM for storing control programs, a counter for counting time, a peripheral input/output interface, and the like respectively not shown. The control portion 6 may be structured by using only logic circuits. The control programs may be stored in ROM or may be transferred externally via a peripheral input/output interface. The frame memory controller 7 converts and controls the image data input through arbitration by the bus controller 5 so as to obtain image data suitable for a frame memory 9. The frame memory controller 7 may be a CPU or a media processor capable of parallel computing. The frame memory 9 stores image data of at least one frame to be displayed on a display device 13. The frame memory 9 has a plurality of hierarchical levels. The superposition data controller 8 controls to superpose image data different from that supplied from each input portion 2 on the display device 13. Reference numeral 10 represents a superposition data memory for storing data to be superposed. Reference numeral 11 represents an output display format conversion portion for receiving image data on the bus under the control of the bus controller 5 and for converting it into image data having a display format suitable for a display driving controller 12 which drives the display device 13. The display device 13 may be a CRT or a flat display panel (liquid crystal, plasma or the like) having a matrix electrode structure. The display device 13 may be a single display device or a plurality of display devices. Image data supplied from the image source 1 is displayed on this display device 13.

Reference numeral 14 represents a selection portion for switching between high speed serial data lines which can transmit and receive multiplexed packet data of an input/output device of each image source 1 such as a mouse (infrared input type), a keyboard and a speaker. An example of transmitting multiplexed packet data of received data is IEEE 1394 (The Institute of Electrical and Electronics Engineers, Inc), USB (Universal Serial Bus) or the like. Reference numeral 15 represents a packet distribution control portion for controlling to distribute serial data selected by the selection portion 14 in the unit of packet. Reference numeral 16 represents a packet control portion with a FIFO memory for controlling the reception timing of packet data supplied to the display system. Reference numeral 21 represents a display pointer controller for controlling to move the cursor of a mouse and an image superposed on the display device. A plurality of display pointer controllers may be provided. Reference numeral 22 represents a joy stick for moving the mouse of the image source 1, and reference numeral 24 represents a joy stick for moving a display pointer. Reference numeral 23 represents a control button of the mouse, and reference numeral 25 represents a control button of the display pointer, these buttons serving as confirmation buttons. Reference numeral 30 represents a change button for changing a display layout on the display device.

Reference numeral 20 represents an infrared data receiving portion for receiving infrared data transmitted from the display pointer controller 21. Reference numeral 19 represents an infrared data control portion for outputting data received from the receiving portion 20 to the control portion 6 and an infrared data conversion portion 18 which converts the data supplied from the infrared data control portion 19 into a serial data packet. Reference numeral 17 represents a FIFO memory which is used for controlling the timing of transferring the packet data supplied from the infrared data conversion portion 18 to the packet control distribution control portion 15.

Reference numeral 26 represents a packet control portion with a FIFO memory which is used for controlling the reception timing of a sound packet supplied from each image source 1. Reference numeral 27 represents a D/A converter for converting input digital sound data into analog data. Reference numeral 28 represents a sound amplifier, and reference numeral 29 represents a speaker of the display system 31.

The operation of the display system of the embodiment will be described with reference to FIG. 1.

[Initialization]

Each image source 1 and display system 31 communicate with each other via a bi-directional serial communications line of the input portion 2 after powers are turned on. Each input portion 2 supplies the image source 1 with data such as the numbers of dots, display lines, display colors, and a video output timing. The communications are performed by using a communications protocol predetermined both by the input portion 2 and image source 1. For example, a DDC (Display Data Channel 1) of VESA (Video Electronics Standards Association) in USA may be used, and EDID (Extended Display Identification Data) of VESA may be used as the data format. In the communications, the numbers of display dots, display lines and display colors of the display device 13 are supplied, or the display format predetermined at the control portion 6 may be supplied. In accordance with the received information, each image source 1 outputs image data and its control signals to the input portion 2.

The input portion 2 always monitors a connection identification signal to be supplied from the image source in order to check the number of image sources 1 connected to the display system 31. The input portion 2 receives the connection identification signal from the image source as a logical binary signal "1" or "0".

If the connection cable is cut or the power of the image source is turned off, the logical signal "0" is supplied because the input portion 2 is terminated with a resistor. The display system 31 can therefore recognize that image data is not input. This monitor information is supplied to the control portion 6 at a predetermined interval.

The control portion 6 first detects the connection identification signal of the input portion 2-1. If the connection identification signal is "1", the input portion 2-1 sends the received image data to the display format conversion portion 3-1 to covert the format of the image data, whereas if the connection identification signal is "0", the control portion 6 checks the connection identification signal of the next input portion 2-2 and scans the input portion 2 until the connection identification signal of "1" is detected. If all the connection identification signals are "0", the display system 31 enters a power save mode to lower a power supply to the constituent elements excepting the control portion 6, selection portion 14, packet distribution control portion 15, packet control portion 16 with FIFO, FIFO memory 17, infrared data conversion portion 18, infrared data control portion 19, and infrared data receiving portion 20.

Display data in ROM of the control portion 6 is stored in the superposition data memory 10 via the bus and data controller 8.

Instead of ROM of the control portion, the display data may be supplied to the control portion 6 via the selection portion 14 and packet control portion 16 with FIFO to be described later.

[Connection of One Image Source]

The case wherein the connection identification signal of only the input portion 2-1 is "1" and the signals of the other input portions are "0", will be described.

The input portion 2-1 outputs image signals having a desired format to the display format conversion portion 3-1. If the supplied display format is equal to the display format (dot number, line number and color number) of the display device 13, the supplied image data is passed to the bus interface, whereas if they are different, the supplied display format is converted into the display format of the display device 13 by processing the supplied image data to have proper dot number and line number. If the number of colors of the supplied image data is larger than the number of colors the display device 13 can display, the number of bits of image data is reduced at an intermediate image data process such as a dither process.

The image data output from the display format conversion portion 3-1 is stored in the frame memory 9 via the bus interface 4-1, bus controller 5 and frame memory controller 7.

The frame memory 9 has a plurality of hierarchical levels. The level at which the input data is stored is controlled by the bus controller 5 under the control of the control portion 6.

Image data stored in the frame memory 9 is output to the bus at a timing controlled by the control portion 6 and to the output display format conversion portion 11. In this case, the hierarchical level of image data to be output is determined by the bus controller 5 under the control of the control portion 6.

In addition to the input image data, display data stored in the superposition data memory 10 is output to the bus via the superposition data controller 8 under the control of the control portion 6 to be displayed on the display device 13. Either the superposition data or the input image data output to the bus via the frame memory controller 7 is selected by the output display format conversion portion 11 and the selected data is supplied to the display driving controller 12. This selection timing is determined by the control portion 6.

The output display format conversion portion 11 converts the selected image data into data having a data bus width and the like suitable for the display driving controller 12. The image data converted by the conversion portion 11 is output to the display driving controller 12 which generates a drive signal for driving the display device 13.

If the display device 13 is a TFT liquid crystal panel, this drive signal includes a line sync signal, a frame sync signal, an image data shift clock, image data, an alternating current signal and the like for driving a drive IC of the display device 13.

If the display device is a CRT, the display driving controller 12 converts the digital image data into analog R, G, and B image data and outputs them to the display device 13 together with the horizontal and vertical sync signals.

The display controller 12 supplies proper image data to the display device 13 to display the image data thereon.

[Image Source Control with Display Pointer]

Next, a method of controlling a mouse with the display pointer controller 21 will be described, the mouse controlling the image source 1-1 while image data of the image source 1-1 is displayed.

The display pointer controller 21 forms a packet of X and Y information of the joy stick 22 and ON/OFF information of the control button 23 at a predetermined interval and converts the packet into an infrared signal which is then transmitted. The X and Y information of the joy stick 22 may be either absolute coordinate values or relative coordinate values, this being applicable also to the X and Y information of the other joy stick 23. The transmitted infrared signal is received by the infrared data receiving portion 20 which converts it into an electric signal. The infrared data control portion 19 derives necessary X and Y coordinate values and button ON/OFF data from the packeted electric signal supplied from the receiving portion 20, and outputs the derived data to the infrared data conversion portion 18. The infrared data conversion portion 18 converts again the supplied X and Y information into serial packet data receivable by the image source 1-1. This conversion may be performed in accordance with the specifications of USB (Universal Serial Bus) in recent practical use.

This packet data is input via the data transfer timing control FIFO memory 17 to the packet distribution control portion 15 and combined (mixed) with the input/output data packet of the image source 1-1.

The combined (mixed) X and Y information is transferred via the selection portion 14 to the image source 1-1 so that the position information of the mouse is supplied to a CPU of the image source 1-1. In this case, the selection portion 14 selects a serial data line of the image source 1-1 whose image is currently displayed, under the control of the control portion 6 which recognizes a connection of the image source 1-1.

The display pointer controller 21 forms a packet of X and Y information of the joy stick 24 at a predetermined interval and converts the packet into an infrared signal which is then transmitted. The data receiving portion 20 converts the received infrared data into an electric signal. The infrared data control portion 19 derives necessary X and Y information from the packeted electric signal, and outputs the derived data to the bus controller 5. In this case, if the X and Y information is relative coordinate values, it is converted into the absolute coordinate values which are supplied to the bus controller 8. Conversion into the absolute coordinate values is also applied in the following description. Upon an instruction from the control portion 6, the bus controller 5 controls an output timing when the data stored in the superposition data memory 10 is output to the output display format conversion portion 11 to display the superposition data at the X and Y coordinate values. The display of the superposition data is not performed depending upon an instruction from the control portion 6.

[Connection of Two or More Image Sources]

Next, the case wherein two or more image sources are connected will be described.

It is assumed herein that the image source 1-2 is connected while the image data of the image source 1-1 is displayed.

When the image source 1-2 is connected, the input portion 2-1 detects the connection identification signal and supplies the control portion with the connection identification signal information. When the control portion 6 recognizes a presence of the new second image source 1-2, the control portion 6 supplies the conversion parameters to the display format conversion portions 3-1 and 3-2 for the display format conversion of the image data of the image sources 1-1 and 1-2. The control portion 6 also determines the hierarchical level at which the image data of the image sources 1-1 and 1-2 is stored in the frame memory 9. The hierarchical levels of the frame memory 9 have a priority order. If a plurality of hierarchical data are to be output to the same area of the display device, the output format conversion portion 11 is so instructed that image data having a higher priority order of the hierarchical level is more preferentially displayed than image data having a lower priority order.

Examples of setting the display format conversion parameters and storing image data in the frame memory 9 having a priority order will be described.

Figure 2:
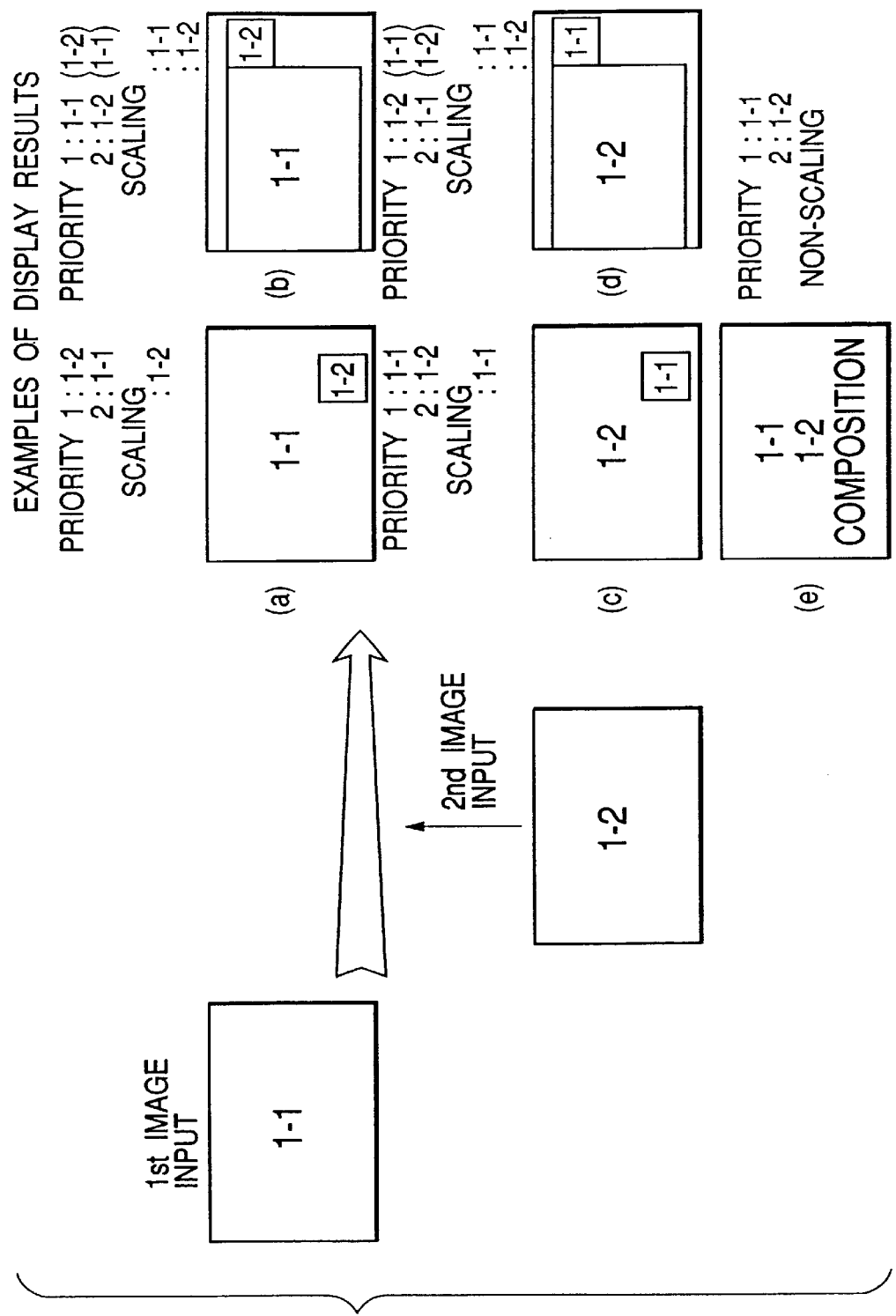
FIG. 2 is a diagram showing examples of a display layout of a display device when a plurality of image sources are input.

FIG. 2 shows examples of a display layout of the display device 13 when a plurality of image sources are connected.

As shown in FIG. 2, consider the case while a first image (1-1) input from the image source 1-1 is displayed on the full screen of the display device, a second image (1-2) is input from the image source 1-2. In this case, there may be five or more display results of the images (1-1) and (1-2), including the display results of (a), (b), (c), (d) and (e). Each display example can be realized by changing the display scaling at the display format conversion portions 3-1 and 3-2 and by changing the hierarchical level of the frame memory 9 having a priority order of the hierarchical level at which image data is stored.

The display example (a) shown in FIG. 2 is realized in the following manner. The display format conversion portion 3-1 stores the image data of the input portion 2-2 in the frame memory 9 at the hierarchical level of the second priority order without performing scaling. The display format control portion 3-2 performs scaling of the image data of the image source 1-2 to reduce the image data by thinning input display dots and lines. The reduced image data is stored in the frame memory 9 at the hierarchical level of the first priority order.

In the display example (b), both the display format conversion portions 3-1 and 3-2 perform scaling to display two images without superposing them.

In the display examples (c) and (d), the images (1-1) and (1-2) of the display examples (a) and (b) are exchanged. In the display example (e), both the display format conversion portions 3-1 and 3-2 do not perform scaling and the image data is stored in the frame memory 9 at the hierarchical level of the first priority order after each image data of the images (1-1) and (1-2) is processed at least in the unit of one pixel by a calculation circuit of the frame memory controller 7.

As described above, when two or more images are input, the display layout of the images can be freely changed by using scaling at the display format conversion portions 3 and the hierarchical level of the frame memory 9.

This display layout change can be performed by instructing the control portion 6 to present one of the display examples (a) to (e) shown in FIG. 2 by pressing the button 30 of the display pointer controller 21 and notifying the control portion 6 of the depression via the receiving portion 20 and infrared data control portion 19. Each time a display layout change is instructed, the control portion 6 notifies a change in the display parameters to the display format conversion portion 3, bus controller 5 and frame memory controller 7.

[Switching between Input/Output Devices by Using Display Pointer]

Next, a method of switching between input/output devices of image sources by using a display pointer will be described which method is a characteristic feature of the invention.

As described earlier, the display pointer controller 21 has the joy stick (mouse) 22 as an input device of image sources, the control button 23 functioning as the confirmation button of the joy stick 22, the joy stick 24 for controlling a pointer displayed on the display device 13 and superposed upon the input image data, and the control button 25 functioning as the confirmation button of the joy stick 24. In this embodiment, the joy stick is used as the input device of the image source 1, an input device such as a keyboard and a tablet may also be used and the output device such as a liquid crystal display and a small printer may also be used.

After an initialization process of determining a reference point of the X and Y coordinates is performed while viewing a superposition pointer displayed on the display device 13, the X and Y coordinate values of the joy stick 22 are supplied to the control portion 6 via the receiving portion 20 and infrared data control portion 19. The control portion 6 calculates coordinate values of four corner points of a window of the display device in which an input image is currently displayed, by using the numbers of dots and lines used by each display format conversion portion 3, and always stores the calculated coordinate values.

The X and Y coordinate values sent from the joy stick 24 are sent to the control portion at a predetermined interval. In order to display the pointer figure stored in the superposition data memory 10 at the position indicated by the coordinate values, the superposition data is output to the output display format conversion portion 11. At this time, the joy stick 22 which is one of the image source input/output devices is connected to the image source 1-1 via the receiving portion 20, infrared data control portion 19, infrared data conversion portion 18, FIFO memory 17, packet distribution control portion 15 and selection portion 14.

The pointer figure in the superposition data memory 10 may be changed by each image source via the route of the selection portion 14, packet control portion 16 with FIFO, control portion 6, bus controller 5 and superposition data controller 8, or may be replaced by a pointer figure stored in ROM of the control portion 6 via the route of the bus controller 5 and superposition data controller 8.

If a user wants to use the joy stick 22 as the input/output device of the image source 1-2 instead of the image source 1-1, the user moves the superposition data figure to the area where the image (1-2) is displayed by using the joy stick 24 and depresses the coordinate confirmation control button 25. Information indicating a depression of the control button 25 is transferred to the control portion 6 via the receiving portion 20 and infrared data control portion 19. Through calculation of the X and Y coordinate information when the button depression information is received and the already known coordinate values of four corner points of the image data display window of each image source, the control portion 6 judges the display window in which the X and Y coordinate values of the display pointer joy stick 24 are located to thereby select the desired image source.

The control portion 6 supplies a control signal to disconnect once the selection portion 14, and after a predetermined time lapse, the serial data line of the image source 1-2 is connected to the packet distribution control portion 15.

With the above operations, peripheral devices using a serial data protocol capable of a hot plug-in connection can be reconfigured relative to a host CPU (in this embodiment, image source 1). Therefore, the joy stick 22 can be used as the input/output device (such as mouse) of the image source 1-2. For example, a peripheral device using USB (Universal Serial Bus) is assigned a specific peripheral device address when it is connected to the host CPU, and the electrical characteristics of the peripheral device are supplied to the host CPU. The host CPU received the electrical characteristics reconfigures the addresses of connected peripheral devices to realize a hot plug-in connection.

With this switching of the selection portion 14 by the control portion 6, sound data supplied to the speaker 29 via the packet control portion 26, D/A converter 27 and sound amplifier 28 are also switched to the image source 1-2. With this change, sound data from a microphone connected to the image source 1-2 and music data from the image source 1-2 can be output from the speaker 29 of the display system 31.

Figure 3:
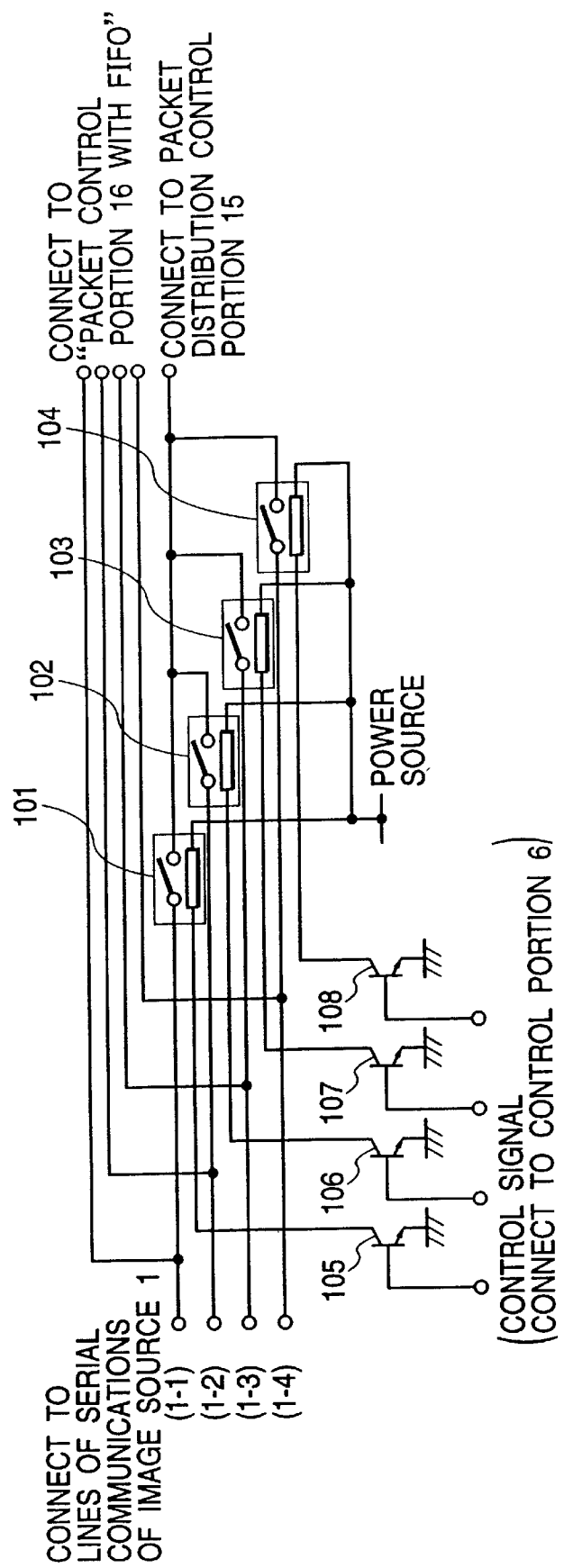
FIG. 3 is a diagram showing the structure of a selection portion.

FIG. 3 is a diagram showing the structure of the selection portion 14.

As shown in FIG. 3, serial data lines of the image sources 1-1, 1-2, 1-3 and 1-4 are connected via relays 101, 102, 103 and 104 to the packet distribution control portion 15.

Switches of the relays 101 to 104 are controlled by transistors 105 to 108. A control signal from the control portion 6 is applied to the base of each of the transistors 105 to 108. If the levels of all the control signals are "L", collector current will not flow through the transistors and the relays 101 to 104 are not operated and become open. Therefore, the image sources 1 and packet distribution control portion 15 are disconnected.

The image source 1 detects a connection state of a peripheral device at a time interval t. This time interval t is counted by an internal counter of the control portion 6 and the control portion 6 stores the non-connection state information. After a lapse of at least the time t, the control portion 6 applies a control signal "H" to the base of the transistor to turn on the relay, to which the serial data line of the image source (e.g., image source 1-2) to be connected is connected, and to connect only one serial bus line to the packet distribution control portion 15. With these operations, the joy stick 22 of the display pointer controller 21 operates as the input/output device (such as a mouse) of the image source (image source 1-2) corresponding to the connection established serial data line.

In this embodiment, switching between serial data lines is performed by using relays. Instead of relays, semiconductor switches or mechanical switches may also be used.

The selection portion 14 has also output paths to the packet control portion 16 with FIFO without intervention of switches such as relays. These output paths can be used to control the control portion 6 directly and independently from each image source 1 by using the serial data lines. Programs to be executed by the control portion 6 may be transferred via these output paths to make the control portion 6 execute the programs. Display data stored in the superposition data memory 10 may also be transferred via these output paths.

Next, with reference to FIGS. 4A to 4C, how the control portion 6 recognizes the window under the display pointer by calculating the X and Y coordinate data of the display pointer and the four corner coordinate data of the window of each image source 1, will be described.

Figure 4A:
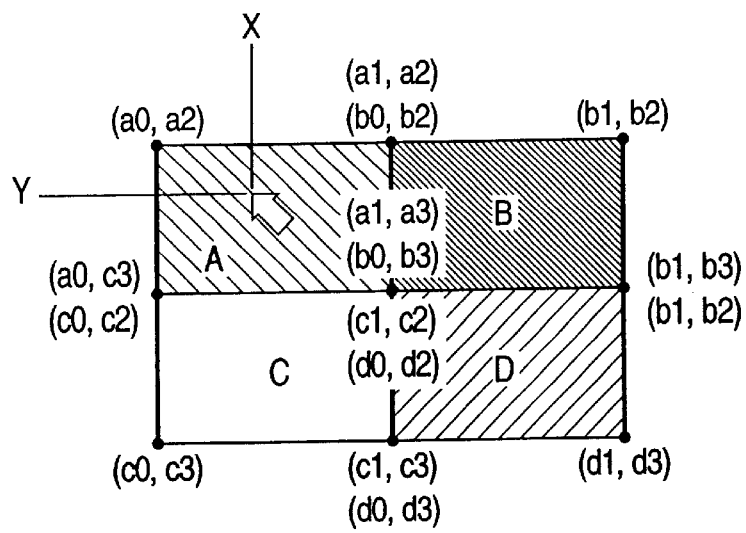
FIGS. 4A, 4B and 4C are diagrams showing examples of images and a display pointer on a display device.
Figure 4B:
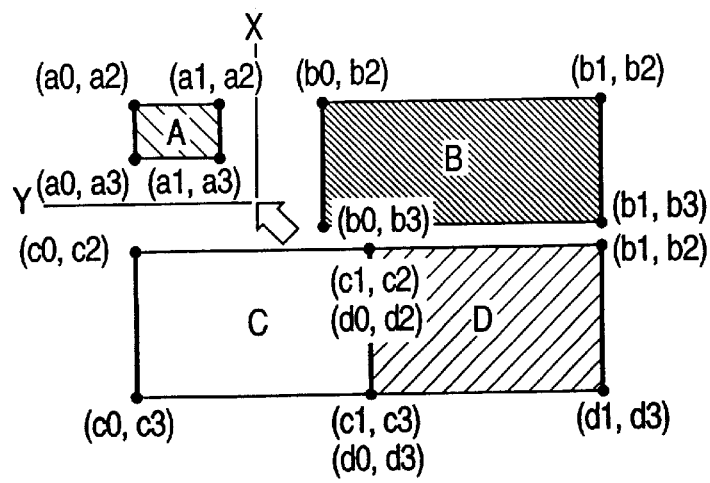
Figure 4C:
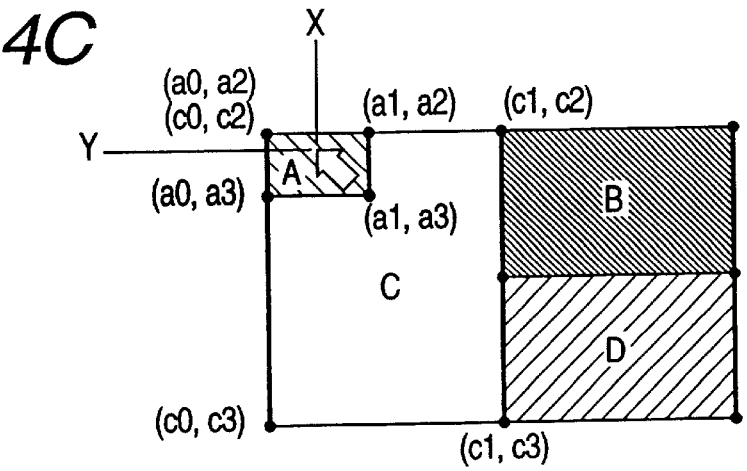

FIGS. 4A to 4C are diagrams showing display examples of an image and a display pointer on the display device 13.

The display example shown in FIG. 4A will be described. In this example, images A, B, C and D of the four image sources corresponding to the image sources 1-1, 1-2, 1-3 and 1-4 are displayed on the display device without any space therebetween.

In this display example, it is assumed that the coordinate values of the display position of the display pointer are X and Y in the X- and Y-axis directions and that the four corner coordinate values of the display window A are (a0, a2), (a1, a2), (a1, a3) and (a0, a3) in the clockwise direction and those of the display windows B, C and D are determined in the similar manner. The display area of the display pointer can be recognized by using a combination of simple addition and subtraction operations:

if $a0 \leq X < a1$ and $a2 \leq Y < a3$, then window is A;

if $b0 \leq X < b1$ and $b2 \leq Y < b3$, then window is B;

if $c0 \leq X < c1$ and $c2 \leq Y < c3$, then window is C; and if $d0 \leq X < d1$ and $d2 \leq Y < d3$, then window is D.

In the case of the display example shown in FIG. 4B where the images A and B of the image sources are subject to scaling, there is no display area under the display pointer. In such a case, switching by the selection portion 14 is not performed even if the control button 25 of the display pointer controller is depressed.

In the case of the display example shown in FIG. 4C wherein the window A is superposed upon the window C, the window under the display pointer corresponds to both the windows A and B. In this case, the image (in this case, A) having a higher hierarchical level of the frame memory 9 is selected.

In the above manner, when the control button 25 is depressed, the control portion 6 can recognize the image source corresponding to the image under the display pointer in accordance with the X and Y coordinate data of the joy stick 24, the four corner coordinate data of each image data display window, and the priority order data of the frame memory storing the image data.

In this embodiment, the display of images entered from a plurality of image sources 1 on the display device can be controlled easily by using the display controller 21 which is the input/output device common to all the image sources.

Further, when a plurality of image data sets are input, the display of the image data can be changed freely in accordance with the scaling by the display format conversion portion 3 and the hierarchical level of the frame memory 9. Therefore, the display control of images entered from a plurality of image sources, such as a change in the display layout, can be performed easily by using the display controller 21 which is the input/output device common to all the image sources.

(Second Embodiment)

FIG. 5 is a block diagram showing the structure of a display system according to the second embodiment of the invention.

In the second embodiment, four television tuners are used as the image sources. The other structures are similar to the first embodiment.

Television signals received by an antenna 209 are detected and frequency-modulated by television tuners 205 to 208. Each encoder 201 to 204 decodes television signals having a standard signal format such as NTSC, PAL and SECAM into composite video signals and sound signals.

The decoded composite signal is input to each input portion 2 and displayed on the display device in the manner similar to the first embodiment.

For the control of each tuner such as a selection of a broadcast station, on/off information of the button of the display pointer controller 21 is supplied to the selection portion via the serial control signal line and via the route of the receiving portion 20, infrared data control portion 19, infrared data conversion portion 18, FIFO memory 17 and packet distribution control portion 15. The control portion 6 controls the selection portion 14 to select one of the tuners 205 to 208 by the joy stick 24 which tuner receives television data of a display image. In this manner, the television program of the display image received by the tuner and selected by the joy stick 24 can be changed easily. In response to a change in the television program, sound data is reproduced from the speaker 29 via the packet distribution control portion 15, packet control portion 26, D/A convertor 27 and sound amplifier 28.

In the second embodiment, the control of the image entered from the television tuner, such as a change in the television program, can be performed with advantageous effects similar to the first embodiment.

In the first and second embodiments, control programs may be supplied from an external apparatus, and in accordance with the supplied control programs, the display of an image on the display device 13 may be controlled. In this case, the control is executed by the control portion 6 in place of the display pointer controller 21. In the second embodiment in particular, if a digital television broadcast station superposes control data, such as display image scaling and superposition, upon television image data, various controls such as display control can be performed by using the superposed control data, without controlling the control portion 6 by using the display pointer controller 21. In this case, the control data is supplied to the control portion 6 via the packet control portion 16 with FIFO without using the relays 101 to 104 of the selection portion 14.

In the first and second embodiments, when data of the display pointer and joy stick is transferred from the display pointer controller 21 to the display system 31, infrared light is used. The invention is not limited only to infrared light, but radio waves or signalling lines may also be used.
(Third Embodiment)

FIG. 6 is a block diagram showing the structure of a display system according to the third embodiment of the invention. In the third embodiment, information supplied from four independent image sources is displayed on one monitor. The number of image sources may be larger than or smaller than four. In FIG. 6, components having similar structures to those shown in FIG. 1 are represented by using identical reference numerals, and the description thereof is omitted.

Referring to FIG. 6, image sources 1-1, 1-2, 1-3 and 1-4 have user information input means (not shown) such as a mouse for entering user information indicating, for example, a position of an image source pointer. Reference numerals 14-1, 14-2, 14-3 and 14-4 represent a packet control portion with FIFO which is used for controlling a timing of transmitting and receiving high speed serial communications packet data between the image sources 1-1 to 1-4 and the control portion 6 of the display system 40 of this embodiment. In this embodiment, by using these high speed bi-directional serial communications packet control portions 14-1 to 14-4, switching between update and non-update of windows for the image sources, controlling a pointer, and other controls are performed.

Examples of multiplexed packet data transfer are IEEE 1394, USB (Universal Serial Bus) or the like. USB is most suitable for this embodiment because presently available desk top type PC's and note type PC's are provided with USB ports and USB supports a hot plug-in connection (allowing plug-in and plug-out during operation). From the viewpoint of the characteristic features of the invention, serial communications of other types are also applicable with similar advantageous effects. Apparatuses for USB include a USB host and USB devices. Generally, the USB host is a personal computer, and the USB devices are peripheral apparatuses such as a mouse, a keyboard and a printer. In this embodiment, the packet control portions 14-1 to 14-4 function as the USB devices.

The operation of the display system 40 of the third embodiment will be described with reference to FIG. 6.
[Initialization]

Each image source 1-1, 1-2, 1-3, 1-4 and display system 40 communicate with each other via a bi-directional serial communications line of each input portion 2-1, 2-2, 2-3, 2-4 after powers are turned on. Initialization similar to the first embodiment is performed. If all the connection identification signals are "0", the display system 40 enters a power save mode to lower a power supply to the constituent elements excepting the control portion 6, selection portion 14, infrared data control portion 19, and infrared data receiving portion 20.
[Connection of One Image Source]

If the connection identification signal of only the input portion 2-1 is "1" and the signals of the other input portions are "0", the processes similar to the first embodiment are executed.

A serial data communications line using USB is established between the image source 1-1 and packet control portion 14-1. The control portion 6 first transmits "device information" to the image source 1-1, the device information being held by the display system 40 of this embodiment. In this embodiment, the device information contains a device type, device function, FIFO capacity and the like:

Device Type: pointer device and multiwindow display device;

Device Function: transmission/reception of X and Y coordinate motion data and other data;

FIFO Capacity: 32 bytes.

In accordance with the received device information, the image source (personal computer, work station, video apparatus or the like) registers the devices, and if necessary, loads device drivers, to prepare for communications.
[Control of Image Source Pointer by Remote Control Joy Stick]

Next, a method of controlling a pointer displayed on the image of the image source 1-1 by a subsidiary joy stick 22 and a subsidiary button 23 of a remote controller of the display system 40 of this embodiment will be described. The operation of the control portion 6 will be described with reference to the flow chart of FIG. 13. A pointer on the image of the image source 1-1 is a mouse pointer or the like which is displayed while the image source 1-1 such as a personal computer and video apparatus operates under the GUI environment.

The remote controller 21 forms a packet of the X and Y coordinate motion information of the subsidiary joy stick 22 and ON/OFF information of the subsidiary button 23 and converts the packet into infrared data. This infrared data is received by the infrared data receiving portion 20 and converted into an electrical signal. The infrared data control portion 19 derives necessary X and Y coordinate motion data and button ON/OFF data from the packeted electrical signal supplied from the infrared data receiving portion 20, and supplies the derived data to the control portion 6.

Figure 15:
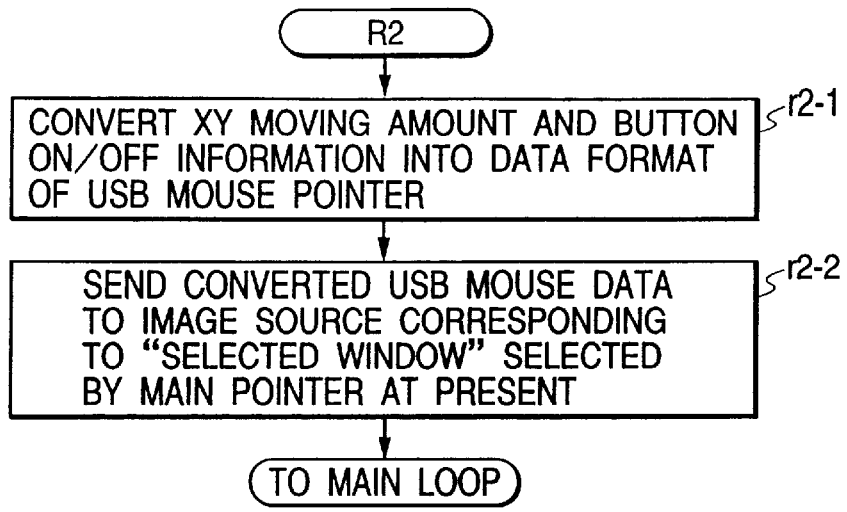
FIG. 15 is a flow chart illustrating a process R2 in the flow chart shown in FIG. 13.
Figure 16:
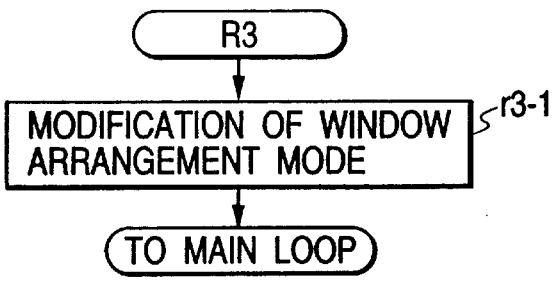
FIG. 16 is a flow chart illustrating a process R3 in the flow chart shown in FIG. 13.

The control portion 6 transfers the X and Y coordinate motion data and button ON/OFF data to the image source 1-1 over USB serial communications. In this case, the control portion 6 converts the format of the X and Y coordinate motion data and button ON/OFF data into the format of the "USB pointer device" previously registered in the image source, and writes the format converted data into the packet control portion 14-1 to thereby transfer the data to the image source 1-1 over USB serial communications. The above operations of the control portion 6 are illustrated in the process R0 (r0-2) shown in FIG. 13 and the process R2 shown in FIG. 15.

In this manner, the information of the subsidiary joy stick 22 and subsidiary button 23 of the remote controller 21 is transferred to the GUI environment on the side of the image source 1-1 over SUB serial communications. Therefore, the remote controller can change the position of the mouse and control the selection operation (mouse click) and the like as if the joy stick 22 of the remote controller 21 is a pointing device of the image source 1-1. This operation state is illustrated in FIG. 7A.
[Control of Main Pointer by Remote Control Joy Stick]

Figure 7A:
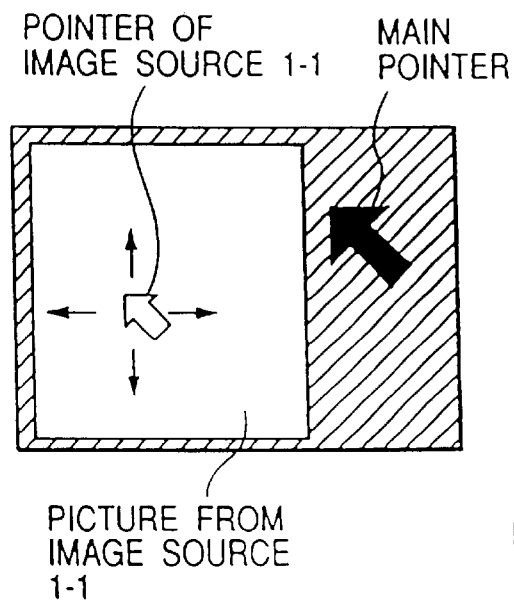
FIGS. 7A and 7B show a display screen, a window, a main pointer, and an image source pointer on a display control system.

With reference to FIG. 7A, the control of the main pointer by the remote controller 21 will be described. The display system 40 displays the main pointer independently from images of the image sources 1-1 to 1-4. The main pointer plays an important roll of selecting a window for each image source and realizing various functions of the display system.

The remote controller 21 forms a packet of the X and Y coordinate motion information of a main joy stick 24 and ON/OFF information of a main button 23 and converts the packet into infrared data. This infrared data is received by the infrared data receiving portion 20 and converted into an electrical signal. The infrared data control portion 19 derives necessary X and Y coordinate motion data and button ON/OFF data from the packeted electrical signal supplied from the infrared data receiving portion 20, and supplies the derived data to the control portion 6.

Figure 14:
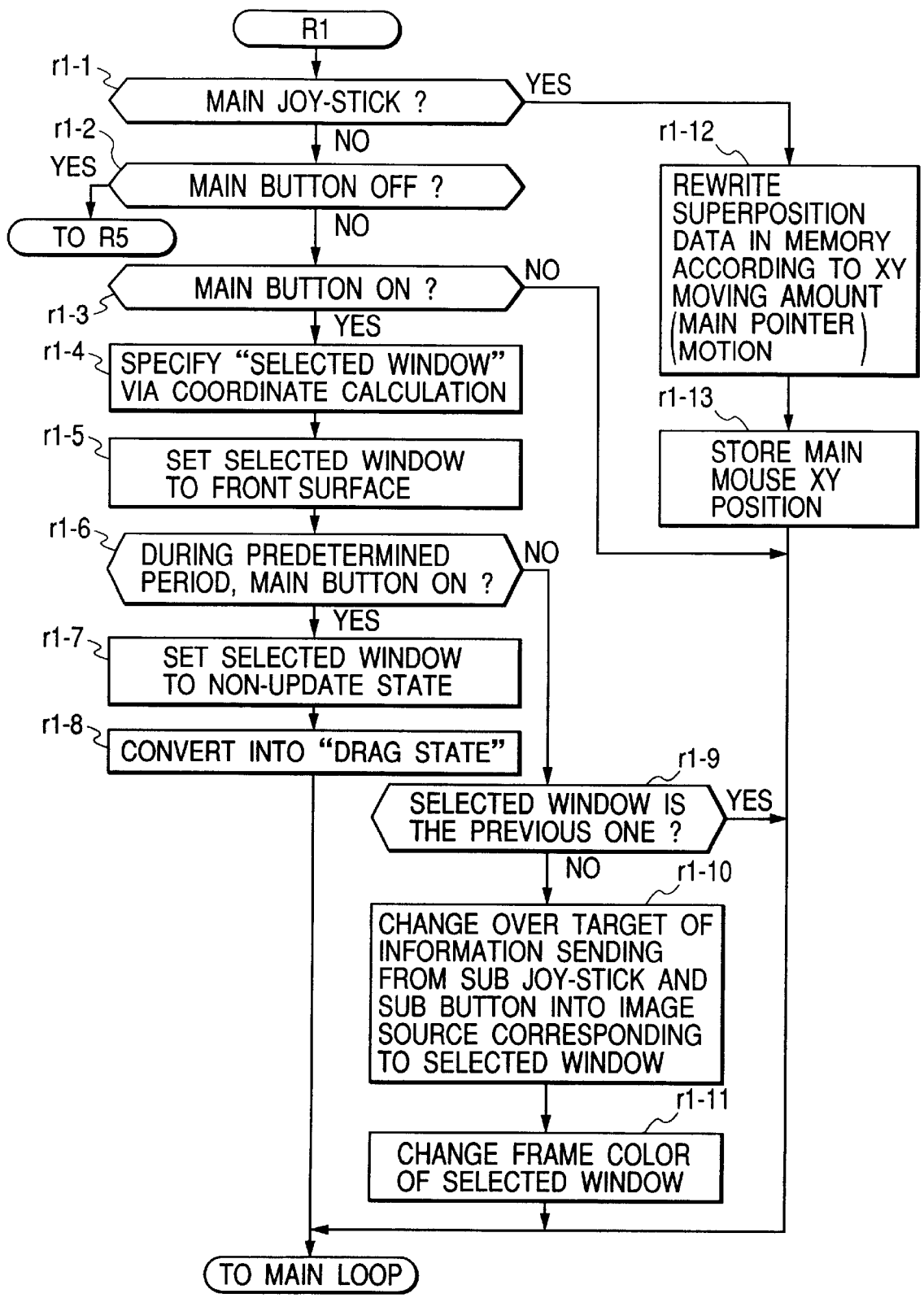
FIG. 14 is a flow chart illustrating a process R1 in the flow chart shown in FIG. 13.

In accordance with the X and Y coordinate motion information supplied from the remote controller 21, the control portion 6 rewrites the data stored in the superposition data memory 10 so that the main pointer (the process R1 (r1-1, r1-12, r1-13) in the flow chart shown in FIG. 14) can be moved and the display image can be selected in accordance with the ON/OFF information of the main pointer 25. The superposition data memory 10 has a capacity corresponding to the screen size of the display device and has a depth of at least one bit.

Figure 7B:
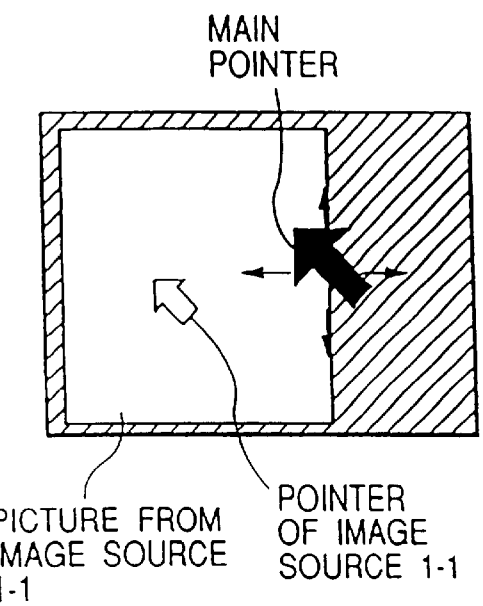

The above operation state is illustrated in FIG. 7B. Since it is assumed in this description that only one image source is connected, only the image of the image source 1-1 is displayed on the screen of the display device. Therefore, in FIG. 7B, the on off operation of the main button 25 selects the whole image of the image source 1-1.

Figure 13:
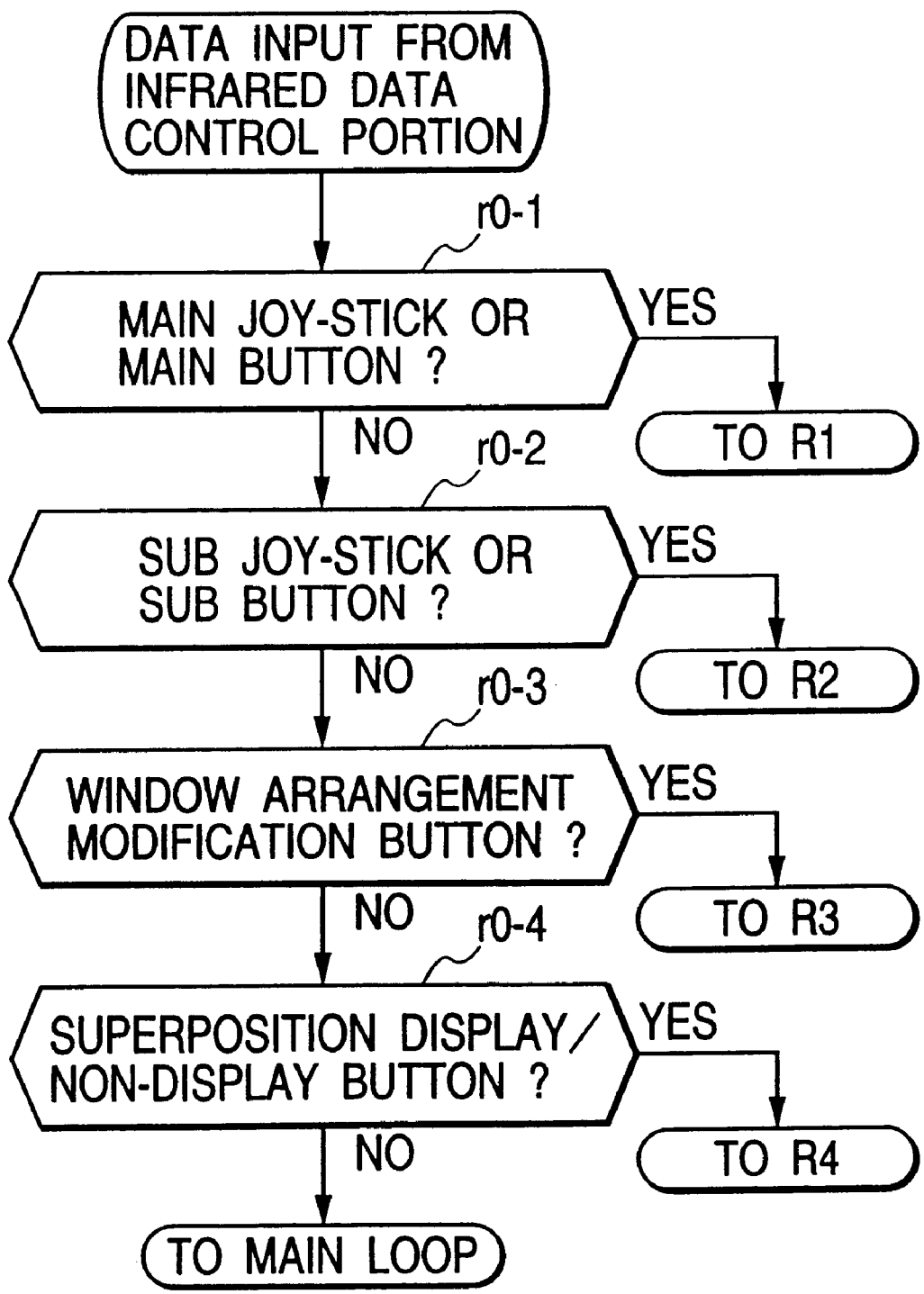
FIG. 13 is a flow chart illustrating the operation of a main process to be executed when data is input from an infrared data control portion of a control portion 6 of a display control system 40.

The above operations of the control portion 6 are illustrated in the process R0 (r0-1) in FIG. 13 and the process R1 (r1-1 to r1-5) in FIG. 14.

Figure 17:
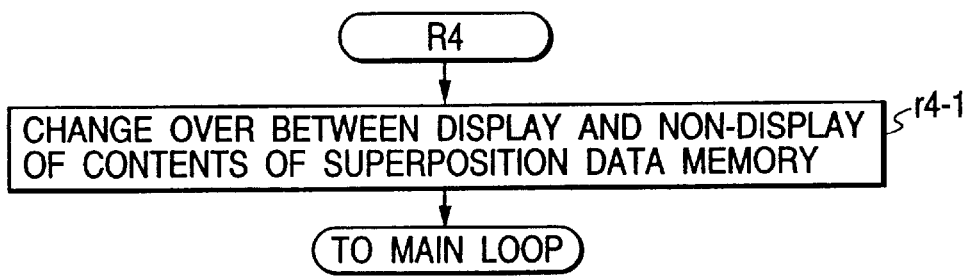
FIG. 17 is a flow chart illustrating a process R4 in the flow chart shown in FIG. 13.
Figure 18:
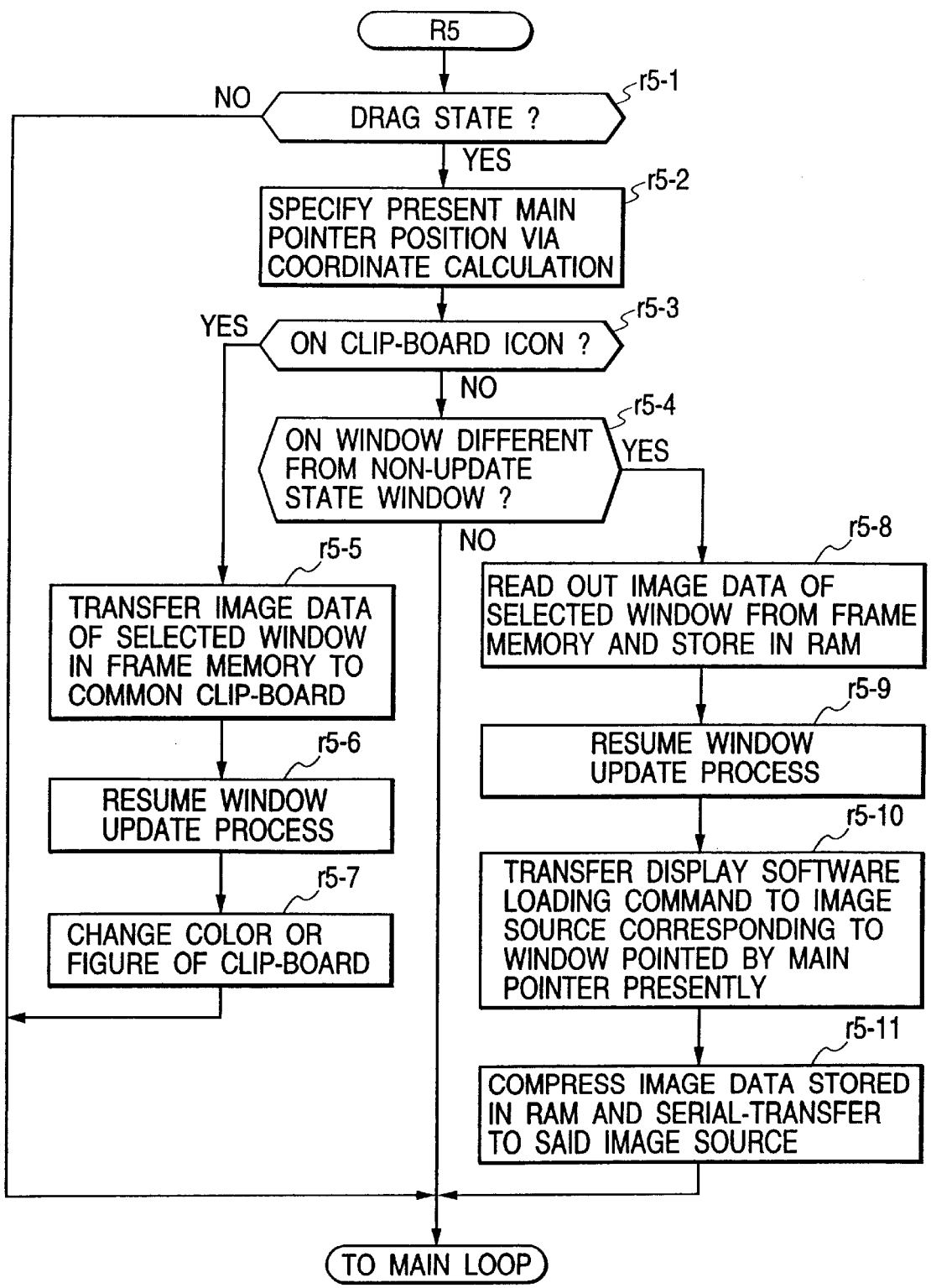
FIG. 18 is a flow chart illustrating a process R5 in the flow chart shown in FIG. 13.

The control portion 6 instructs the bus controller 5 to enable to control to output or not to output the data in the superposition data memory 10 to the output display format conversion portion 11 in order to display or not to display the main pointer. This control is performed by depressing the button 31 of the remote controller. Similar to the above description, the ON/OFF information of the button 31 is once converted into packeted infrared data and supplied to the control portion (process R0 (r0-4) in FIG. 3 and process R4 in FIG. 17).

[Connection of Two or More Image Sources]

If two or more image sources are connected, the processes similar to the first embodiment are executed.

[Switching between Input Device Controls of Image Source by Main Pointer]

Next, a method of switching between input device controls of an image source by the main pointer will be described.

The remote controller 21 has the subsidiary joy stick 22 and subsidiary button 23 which are input devices of the image source and the main joy stick 24 and main button 25 for controlling the main pointer displayed on the display device and superposed on the input image data.

The control portion 6 of the display system 40 calculates the four corner coordinate values of the window currently displaying an image, from the numbers of dots and lines to be used for scaling by the display format conversion portions 3-1 to 3-4, and always stores the calculated coordinate values.

Figure 8A:
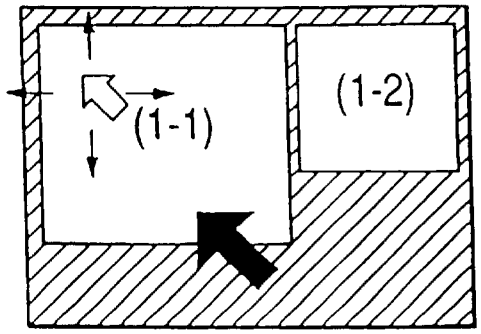
FIGS. 8A and 8B show a display screen, windows, a main pointer, and an image source pointer on a display control system.
Figure 8B:
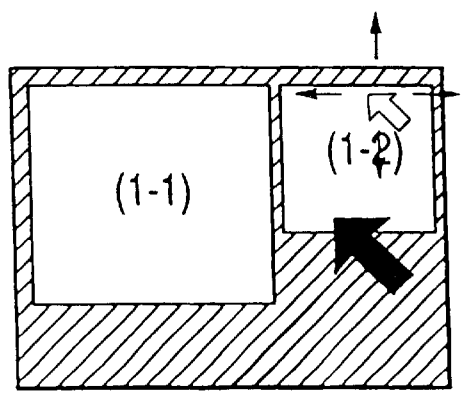

The X and Y coordinate values calculated by the control portion 6 in accordance with the X and Y coordinate motion amount supplied from the main joy stick 24 are used for drawing a pointer figure of a mouse or the like in the superposition data memory 10 at the location corresponding to the X and Y coordinate values to thereafter output the superposition data to the output display format conversion portion 11. In this case, the subsidiary joy stick 22 functioning as one of the input devices of the image source 1-1 by the operations described previously is being connected to the image source 1-1 via the infrared data receiving portion 20, infrared data control portion 19, control portion 6, and packet control portion 14-1, to thereby transfer a packet of a X and Y coordinate motion amount and the like and allow the mouse of the image source 11 to move in accordance with the operation of the subsidiary joy stick 23 (FIG. 8A).

If a user acting upon the remote controller 21 wishes to use the subsidiary joy stick 22 as the input device for controlling the image source 1-2 instead of the image source 1-1, the user moves the main pointer to the area in which the image data 1-2 is displayed by using the main joy stick 24, and then depresses the main button 25. Information of a depression of the button 25 is transferred to the control portion 6 via the infrared data control portion 19. By using the X and Y coordinate information when the button information is received and the already known four corner coordinate values of the image data display window of each image source, the control portion 6 checks through calculation the window having the X and Y coordinate values of the main pointer (process R0 (r0-1) in FIG. 13 and process R1 (r1-1 to r1-4) in FIG. 14).

If the time while the main button 25 is depressed (button ON) is a predetermined time or shorter and if it is recognized that the current coordinate position is on a window different from a window when the main button 25 was depressed previously, then the control portion 6 switches the packet destination of USB serial communications. Namely, data write into the packet control portion 14-1 in order to supply the image source with the X and Y coordinate motion information of the subsidiary joy stick 22 and the ON/OFF information of the subsidiary button 23, is stopped, and data write into the packet control portion 14-2 starts for the image source 1-2. The color of the frame of the selected window is changed to explicitly shown the currently selected widow, and the color of the frame of the previously selected window is changed to a usual color (process R1 (r1-6, r1-9 to r1-11) in FIG. 14).

Therefore, the user can control a mouse cursor or the like displayed on the window of the image source 1-2 by using the subsidiary joy stick 22 and subsidiary button 23 as if the subsidiary joy stick 22 and subsidiary button 23 are pointing devices of the image source 1-2.

Figure 22:
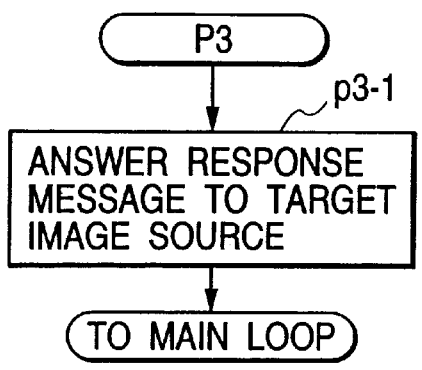
FIG. 22 is a flow chart illustrating a process P3 in the flow chart shown in FIG. 19.
Figure 23:
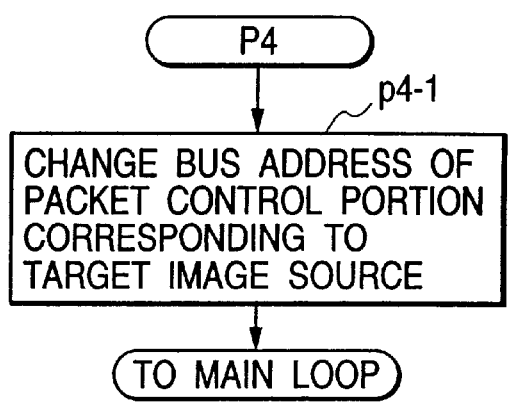
FIG. 23 is a flow chart illustrating a process P4 in the flow chart shown in FIG. 19.
Figure 24:
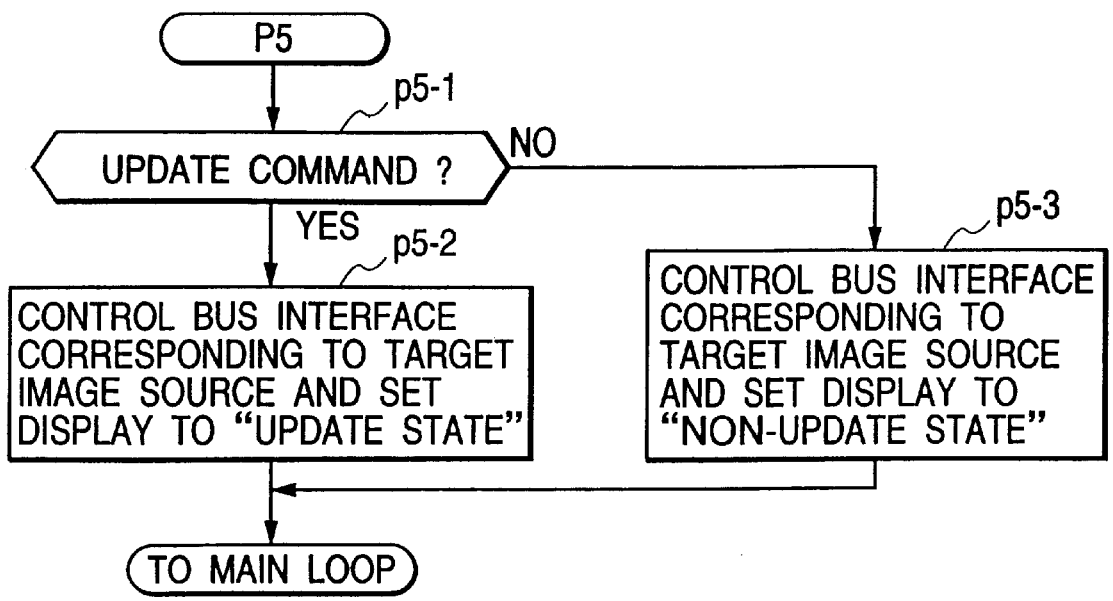
FIG. 24 is a flow chart illustrating a process PS in the flow chart shown in FIG. 19.

In this embodiment, USB is used for serial data communications. In most of serial communications such as USB, communications data such as a command is periodically or non-periodically sent from a host (in the embodiment, image source) to even an input device such as a pointing device which has generally a data flow only from the device to the host. If the input device does not respond to the command, some problem occurs. An example of such a command is a reallocation command of device addresses on the bus. If such a command is not properly responded, the host (image source) sometimes recognizes that the device is in an abnormal state. In order to avoid such a case, even if the main pointer selects the image source 1-2 and a packet of an X and Y coordinate motion amount of the pointer is transmitted or received via the packet control portion 14-2, the control portion 6 performs communications via the packet control portion 14-1 in response to the communications data such as a command from the image source 1-1 not selected. Such operations of the control portion 6 are illustrated in a process P0 (p0-1, p0-2) shown in FIG. 19, a process P1 (p1-1, p1-2) shown in FIG. 20, a process P3 shown in FIG. 22, and a process P4 shown in FIG. 20.

How the control portion 6 recognizes the window under the main pointer by calculating the X and Y coordinate data of the main pointer and the four corner coordinate data of the window of each image source, has been described with reference to FIGS. 4A, 4B and 4C.

[Control of Update or Non-update of Display by Image Source]

Figure 9:
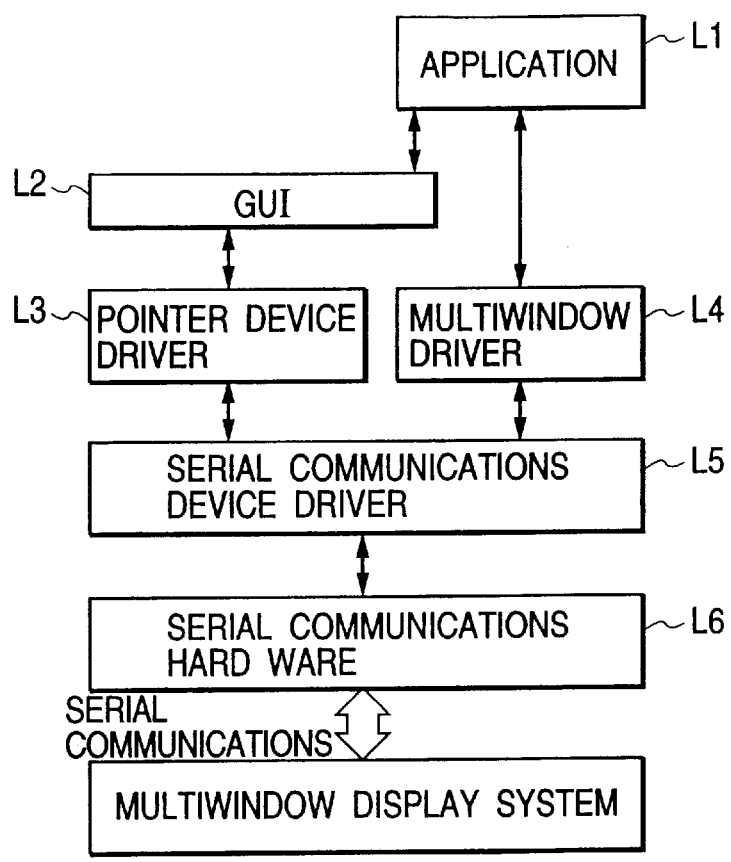
FIG. 9 is a diagram illustrating a relation between a general software configuration and an embodiment software configuration under the graphic user interface (GUI) environment on the image source side.

Next, the control of update and non-update of a display of the display system of the embodiment to be executed by the image source will be described. FIG. 9 is a flow chart illustrating a general software configuration when an image source has the GUI environment such as Windows. It is obvious that the software configuration is not necessarily limited thereto.

L5 in FIG. 9 represents a serial communications device driver which, in this embodiment, converts data supplied from an application L1 to be described later into data (USB packet) in conformity with the USB protocol and transfers the USB packet to the application L1.

L3 represents a pointer device driver which receives the X and Y coordinate motion amount of the subsidiary joy stick 22 and ON/OFF information of the subsidiary button 23 of the remote controller 21 via the control portion 6, packet control portion 14, serial communications hardware L6, and serial communications driver L5, and passes the information to GUI L2 so that the remote controller 21 can perform a control of a motion of a mouse pointer of the image source and other controls. The serial communications device driver L5 and pointer device driver L3 may be those drivers provided by GUI environment running on the image source.

A multiwindow driver is specific to this embodiment and converts a command and data supplied from the application L1 into the format matching the specifications of the serial communications device driver L5, and transfers a command and data received from the serial device driver L5 to the application L1.

Figure 10:
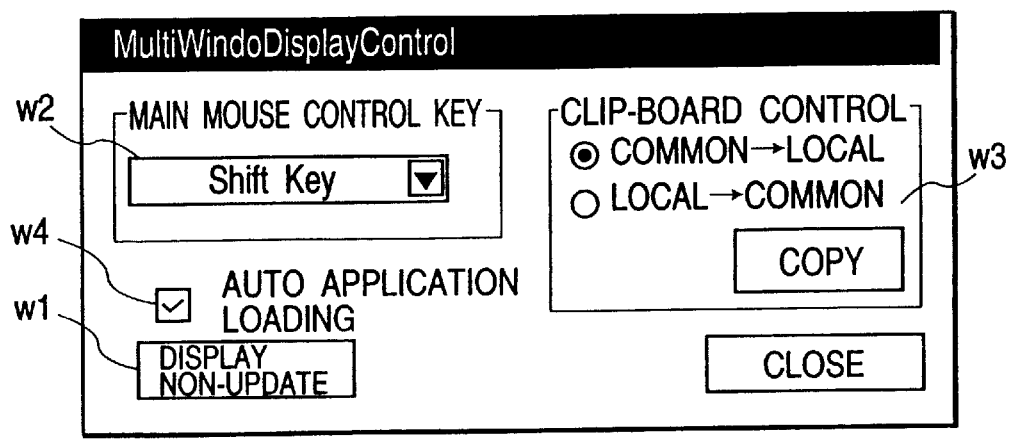
FIG. 10 is a diagram showing an operation screen of an application running under the GUI environment on the image source side according to-an-embodiment.

The application L1 is a multiwindow control application and runs on the GUI environment of the image source. A user operating the image source loads in advance this application or registers in advance this application in the GUI environment to automatically load it when the serial communications bus (in this embodiment, USB bus) to the display system is established. FIG. 10 shows an operation window when the application L1 is loaded. In FIG. 10, w1 represents a button for switching between update/non-update of a display of the display system of the embodiment.

The operations to be executed when a user operating the image source 1-1 depresses the button w1 will be described with reference to FIGS. 19 to 26 and the flow charts shown in FIGS. 27 to 32.

FIGS. 9 to 26 illustrate the operations (data input processes on the side of the packet control portion) of the application and multiwindow driver, and FIGS. 27 to 32 illustrate the-operations (message input processes on the side of the GUI environment) of the control portion 6.

Figure 27:
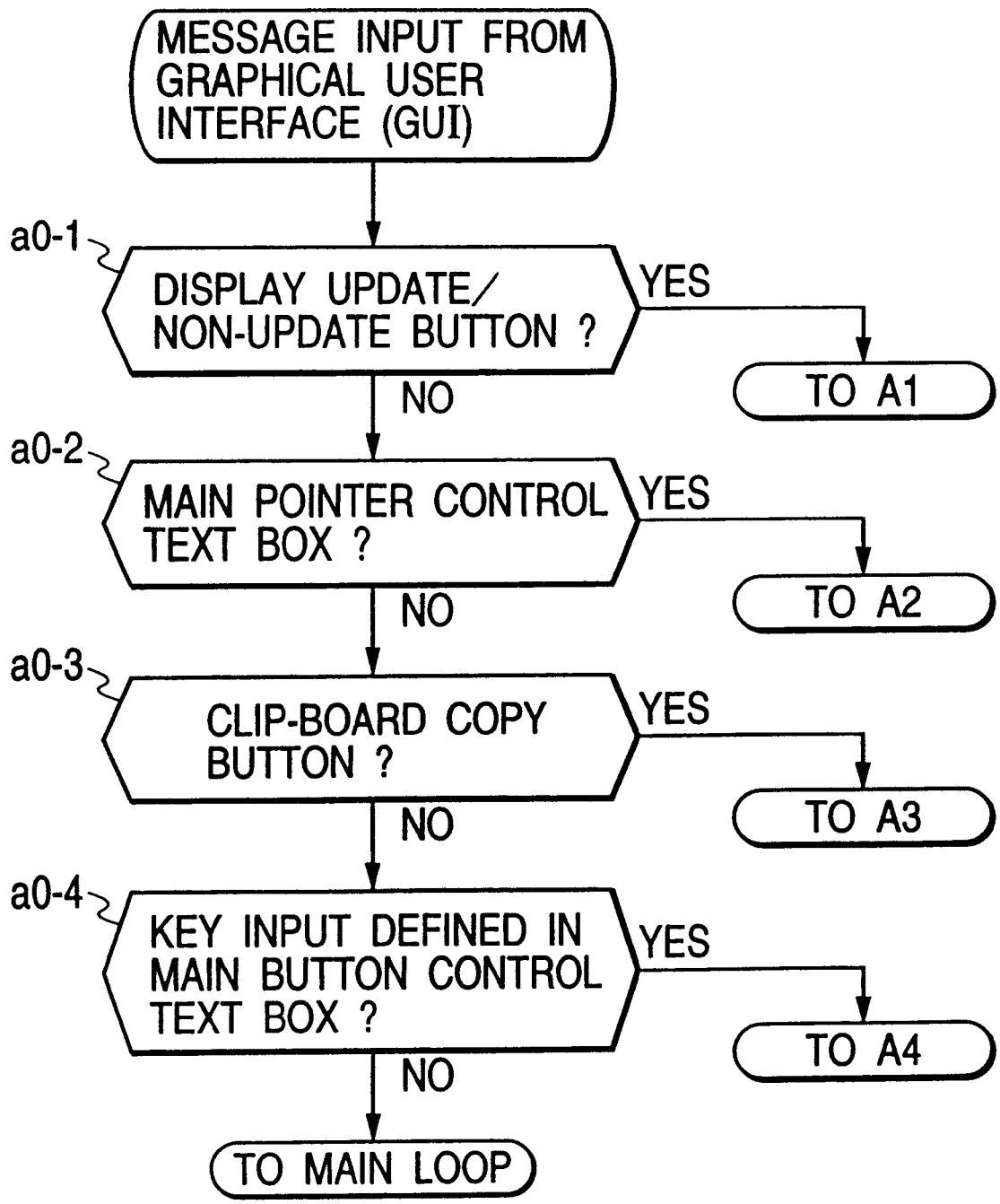
FIG. 27 is a flow chart illustrating the operation of a process to be executed when a message is input from GUI of the control portion 6 of the display control system 40.
Figure 28:
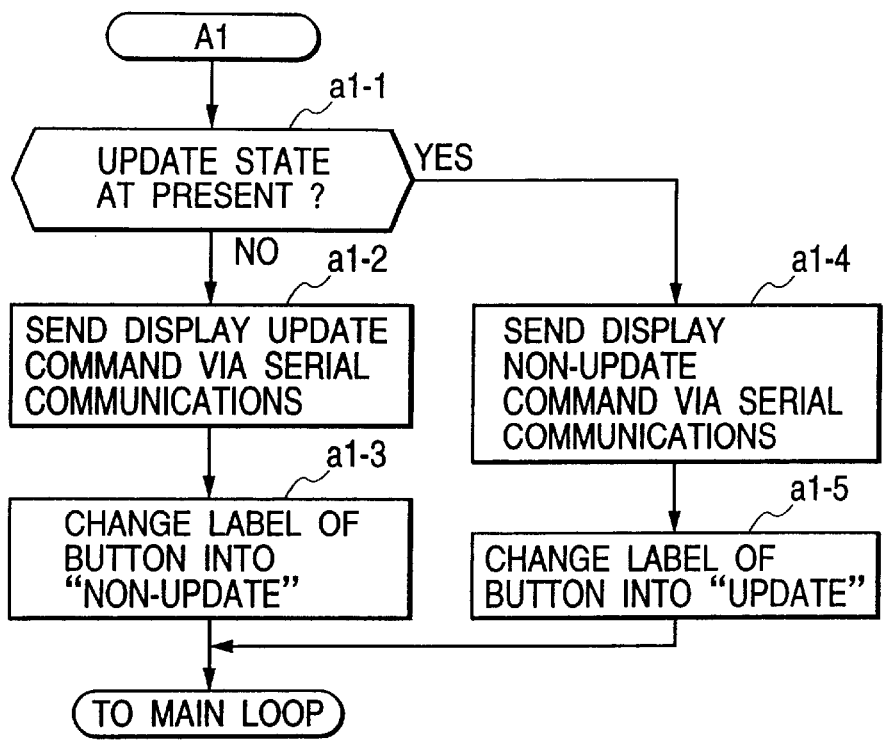
FIG. 28 is a flow chart illustrating a process A1 in the flow chart shown in FIG. 27.
Figure 29:
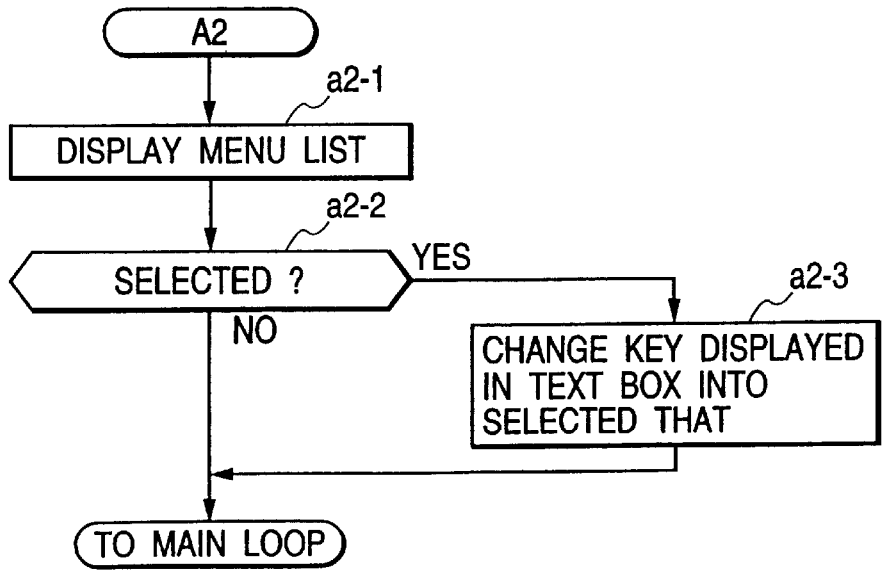
FIG. 29 is a flow chart illustrating a process A2 in the flow chart shown in FIG. 27.

The application L1 notifies the multiwindow driver of a depression of the display non-update button w1 and at the same time changes the label of the button w1 to "display update" (process A0 (a0-1) shown in FIG. 27 and process A1 (a1-1, a1-4, a1-5) shown in FIG. 28). The multiwindow driver L4 converts the received information into a command and transfers the command to the serial communications device driver L5. The serial communications device driver L5 converts the command into a USB serial communications packet which is transmitted to the packet control portion 14-1 of the multiwindow display system. The packet control portion 14-1 again converts the packet into a command and sends the command to the control portion 6. In accordance with this command, the control portion 6 controls the bus interface 4-1 to stop the update of the image of the image source 1-1 (process P0 (p0-1) shown in FIG. 19, process P2 (p2-3) shown in FIG. 21, and process P5 (p5-1, p5-2) shown in FIG. 24).

Contrary, if the user depresses the button labeled "display update", a command is sent via serial communications (process A0 (a0-1) shown in FIG. 27 and process A1 (a1-1, a1-2, a1-3) shown in FIG. 28). In response to this command, the control portion 6 controls the bus interface 4-1 to start updating the image of the image source 1-1 (process P0 (p0-3) shown in FIG. 19, process P2 (p2-3) show n in FIG. 21, and process P5 (p5-1, p5-3) shown in FIG. 24).

With the above operations, the user operating the image source can freely control the update/non-update of the image in the window of the multiwindow display device.

[Data Sharing Using Common Clip Board]
[Display→PC]

Figure 11A:
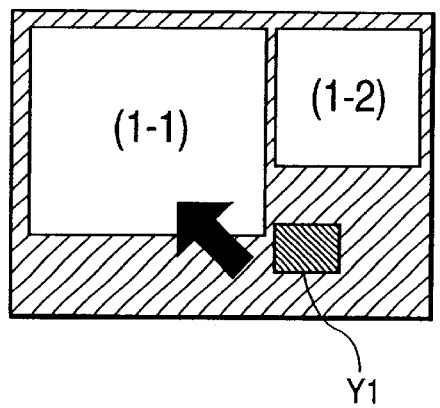
FIGS. 11A and 11B show the display screen of a display control system.
Figure 11B:
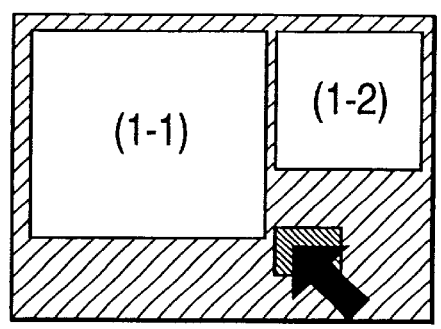

Next, with reference to FIGS. 11A and 11B and the flow charts shown in FIGS. 13 to 26 and FIGS. 27 to 32, a file sharing control by using a common clip board of the display system 40 of this embodiment will be described. The clip board is a memory for temporarily saving data and more particularly a partial area of the memory. This memory area is hereinafter called a "clip board". Y1 in FIGS. 11A and 11B represents an icon which is written in the superposition data memory by the control portion and is called a "common clip board icon". It is herein assumed that two image sources 1-1 and 1-2 are connected.

First, a user moves the main pointer to the image of the image source 1-1 by using the joy stick 24 of the remote controller and depresses (button ON) the button 25 to select the image of the image source 1-1. If the time while the button is depressed is a predetermined time (e.g., 1 second) or longer, the control portion 6 controls the bus interface 4-1 to stop the update of the image of the image source 1-1 (process R1 (r1-1 to r1-8) shown in FIG. 14). This operation state is illustrated in FIG. 11A. The control portion 6 therefore enters a "drag state". If the user moves the main pointer to the "common clip board icon" Y1 while depressing the button 25 and releases the depression (button OFF) of the button 25 (FIG. 11B), then the control portion 6 reads the window area corresponding to the image of the image source 1-1 from the frame memory and stores the read data in RAM of the control portion 6. Thereafter, the control portion 6 instructs the bus interface 4-1 to start again the display update (process R1 (r1-2) shown in FIG. 14 and process R5 (r5-1 to r5-3, r5-5 to r5-7) shown in FIG. 18).

With the above operations, the image of the image source 1-1 is stored in the RAM area of the control portion, i.e., in the "common clip board". Thereafter, the control portion writes data into the superposition data memory so as to change the color or shape of the "common clip board icon" Y1 to explicitly show that the data is being stored in the "common clip board".

Figure 30:
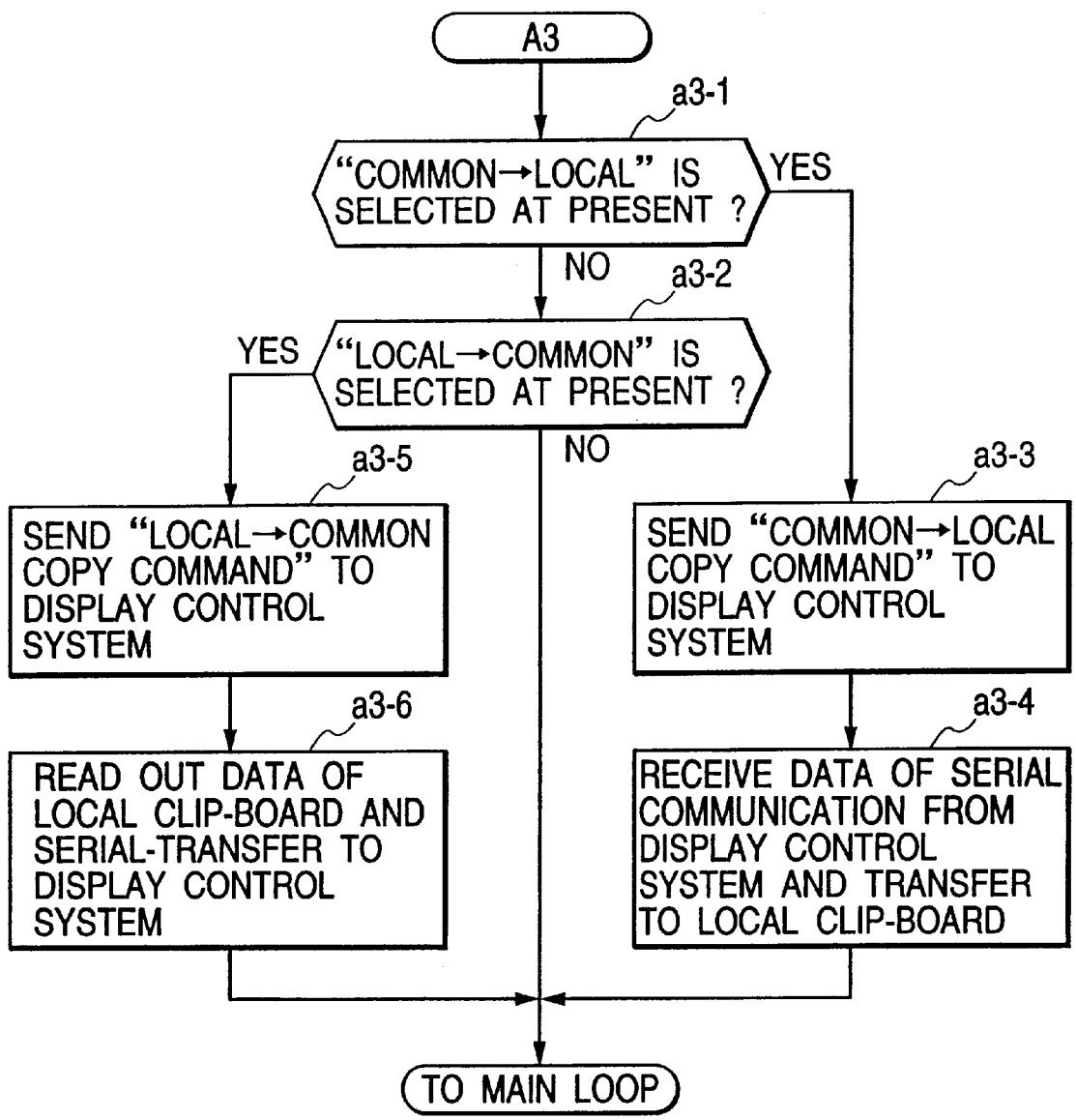
FIG. 30 is a flow chart illustrating a process A3 in the flow chart shown in FIG. 27.
Figure 31:
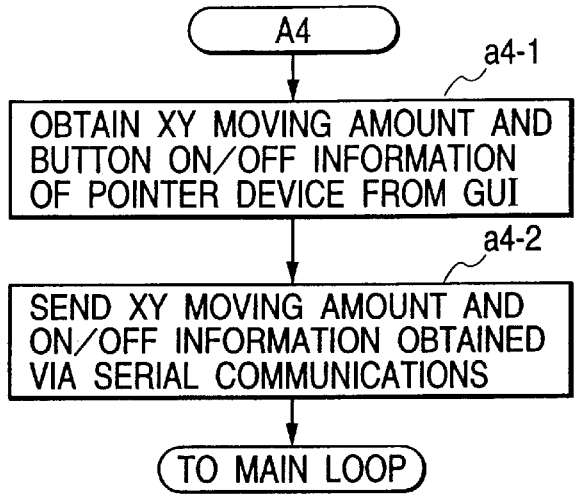
FIG. 31 is a flow chart illustrating a process A4 in the flow chart shown in FIG. 27.
Figure 32:
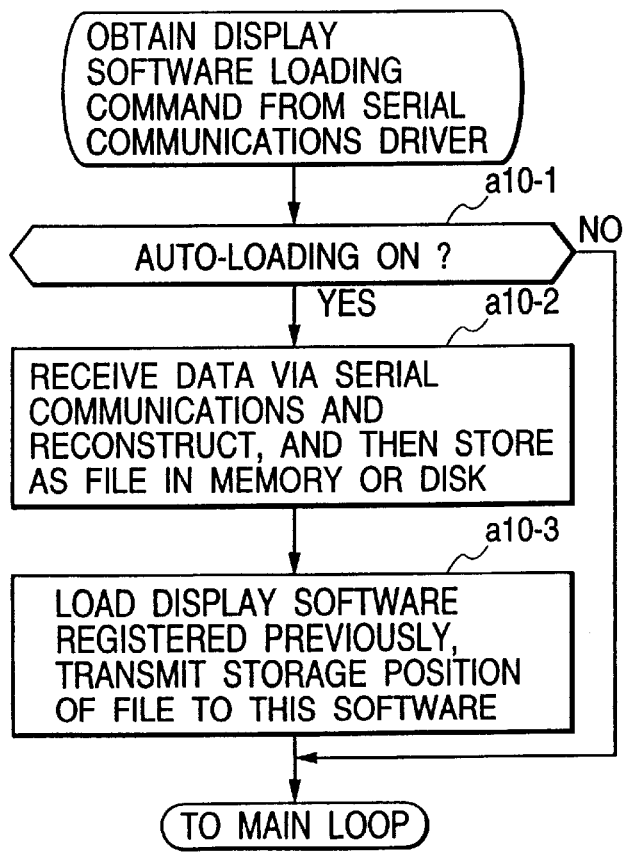
FIG. 32 is a flow chart illustrating the operation of a process to be executed when a display software loading command is obtained from a serial communications driver of the control portion 6 of the display control system 40.

If another user operating the image source 1-2 wishes to copy the data (in this case, image of the image source 1-1) in the common clip board to its own image source 1-1 side, a selection switch "common→local" w3 of the application shown in FIG. 10 is selected and a copy button is depressed so that a command is transmitted to the control portion 6 over USB serial communications to urge the control portion 6 to transmit the data in the common clip board (process A0 (a0-3) shown in FIG. 27 and process A3 (a3-1, a3-3) shown in FIG. 30). Upon reception of this command, the control portion 6 divides the data stored in the internal RAM into data pieces and writes them into the packet control portion 14-2 in order to transmit the data over USB serial communications (process P0 (p0-3) shown in FIG. 19, process P2 (p2-4) shown in FIG. 21, and process P6 (p6-1, p6-3) shown in FIG. 25). The application of the image source 1-2 reconfigures the divided data pieces transmitted over USB serial communications, and transfers the reconfigured data to a "local clip board" under management of the GUI environment running on the image source (process A3 (a3-4) shown in FIG. 30). The memory area for temporarily saving data such as "clip board" of this embodiment is generally defined in the GUI environment. The "local clip board" means such a memory area. The area in which data is actually stored may be a memory IC or a memory disk medium such as a hard disk and a DVD.

With the above operations, it is possible to transfer the image data displayed on the display system to another image source, by using the saving function of the "common clip board".

[PC→PC]

It is possible for the image sources to share image data by using the "common clip board".

For example, a user operating the image source 1-1 transfers data to be shared to the local clip board under management of the GUI environment, and thereafter selects the selection switch w3 "local→common" of the application shown in FIG. 10 and depresses the copy button. In this case, the application L1 first sends a command to the control portion 6 over USB serial communications to notify that the data is transferred. The application then reads the data from the local clip board under management of the GUI environment, converts the data into a packet and transfers the packet to the control portion 6 over USB serial communications (process A0 (a0-3) shown in FIG. 27 and process A3 (a3-2, a3-5, a3-6) shown in FIG. 30).

Figure 19:
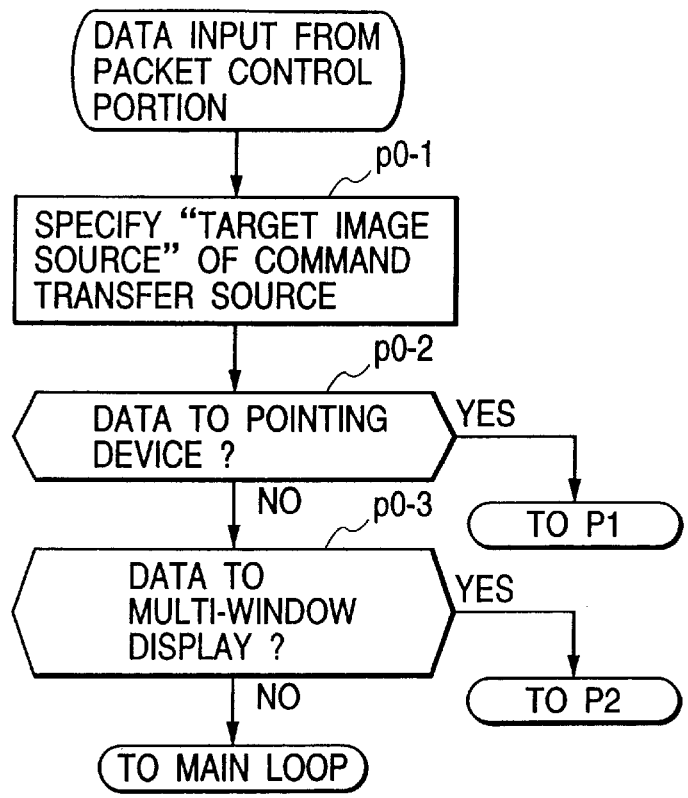
FIG. 19 is a flow chart illustrating the operation of a main process to be executed when data is input from a packet control portion of the control portion 6 of the display control system 40.
Figure 20:
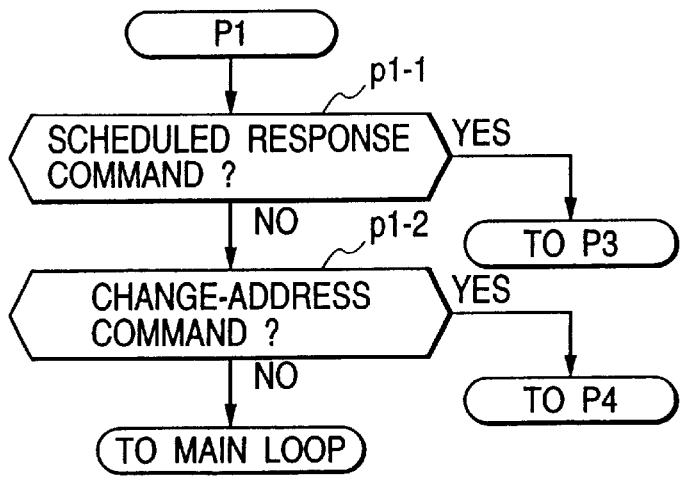
FIG. 20 is a flow chart illustrating a process P1 in the flow chart shown in FIG. 19.
Figure 21:
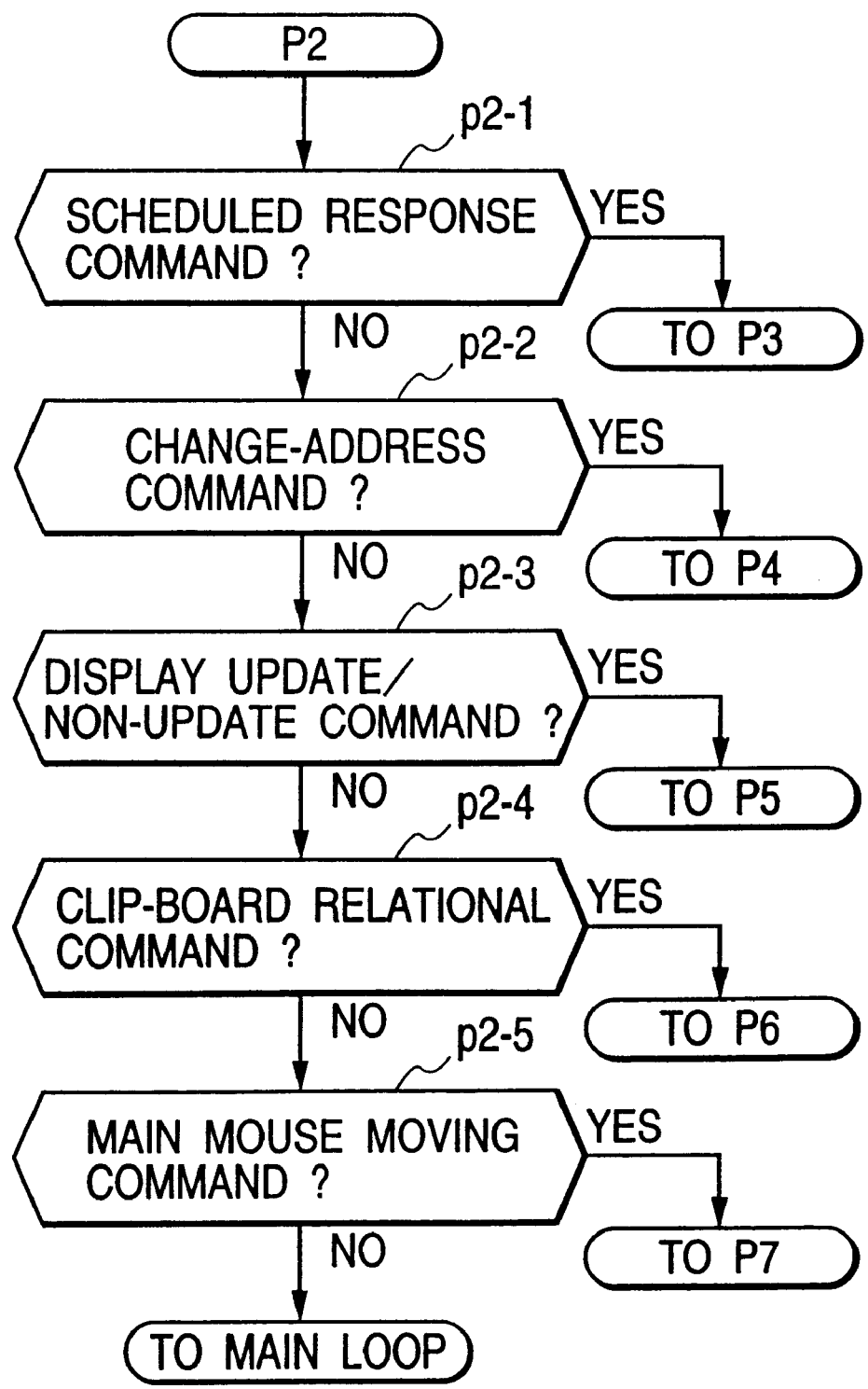
FIG. 21 is a flow chart illustrating a process P2 in the flow chart shown in FIG. 19.
Figure 25:
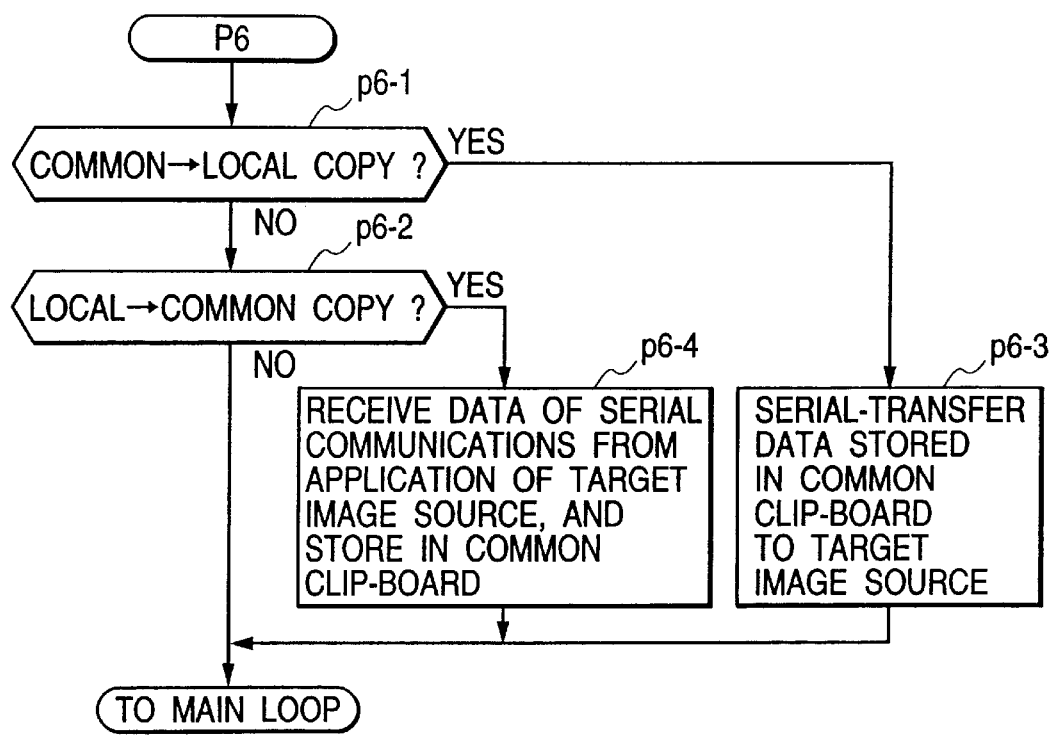
FIG. 25 is a flow chart illustrating a process P6 in the flow chart shown in FIG. 19.

In response to the command, the control portion 6 receives the data via the packet control portion 14-1, saves the data in the internal RAM, and changes the color or shape of the "common clip board icon" of the superposition data memory 10 to explicitly show that the data is being saved in the "common clip board" (process P0 (p0-3) shown in FIG. 19, process P2 (p2-4) shown in FIG. 21, and process P6 (p6-2, p6-4) shown in FIG. 25.

If another user operating the image source 1-2 wishes to copy the data saved in the "common clip board" to the image source 1-2 side, the user selects the selection button w3 "common→local" of the application shown in FIG. 10 and depresses the copy button so that a command is transmitted to the control portion 6 over USB serial communications (process A0 (a0-3) shown in FIG. 27 and process A3 (a3-1, a3-3) shown in FIG. 30).

After the control portion 6 receives this command, it divides the data stored in the internal RAM into data pieces and writes them into the packet control portion 14-2 in order to transmit the data over USB serial communications (process P0 (p0-3) shown in FIG. 19, process P2 (p2-4) shown in FIG. 21, and process P6 (p6-1, p6-3) shown in FIG. 25). The application of the image source 1-2 reconfigures the divided data pieces transmitted over USB serial communications, and transfers the reconfigured data to the "local clip board" under management of the GUI environment (process A3 (a3-4) shown in FIG. 30). With the above operations, it is possible to transfer the image data from the image source 1-1 to the image source 1-2 by using the saving function of the "common clip board".

[Control of Main Pointer by Image Source]

Next, the operation of controlling the main pointer by the image source will be described. It is assumed for example that a user operating the image source 1-1 acts upon the main pointer. The user operating the image source 1-1 operates a pointing device (mouse, track ball, or the like) directly connected to the image source 1-1 while depressing the key displayed in a text widow w2 of the application shown in FIG. 10. In this case, the application acquires the X and Y coordinate motion information of the mouse and ON/OFF information of the button and supplies the information to the multiwindow driver. The multiwindow driver passes the information and its corresponding command to the serial communications driver which forms a packet containing the command and the X and Y coordinate motion information and transfers the packet to the packet control portion 14-1 over USB serial communications (process A0 (a0-4) shown in FIG. 27 and process A4 (a4-1, a4-2) shown in FIG. 31).

Figure 26:
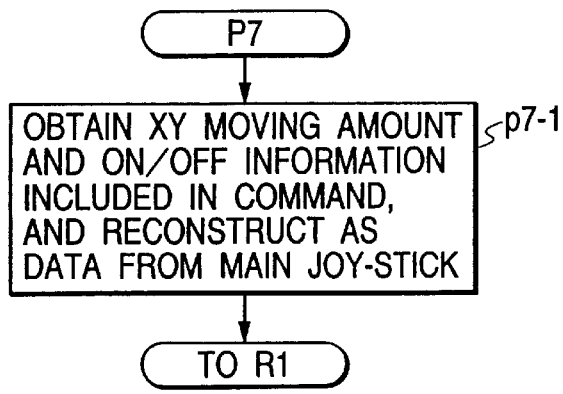
FIG. 26 is a flow chart illustrating a process P7 in the flow chart shown in FIG. 19.

The control portion 6 supplied with the command, X and Y coordinate motion information and ON/OFF information from the packet control portion, executes the operation similar to that for the data supplied from the main joy stick 24 and main button 25 of the remote controller (process P0 (p0-3) shown in FIG. 19, process P2 (p2-5) shown in FIG. 21, and process P7 (p7-1) shown in FIG. 26). More specifically, if the X and Y coordinate motion data is acquired, the control portion 6 writes the data in the superposition data memory to move the position of the main mouse. With such operations, the user operating the image source can control the main mouse without using the remote controller.

The key of the application shown in FIG. 10 to be used for controlling the main mouse may be "Alt key", "Ctrl key" or the like, instead of the "Shift key". If the key is to be changed, the text window w2 of the application is clicked with the mouse to select a desired one from candidates (Alt key/Ctrl key/Shift key) displayed in a menu list (process A0 (a0-2) shown in FIG. 27 and process A2 (a2-1, a2-2, a2-3) shown in FIG. 29).

[Automatic Loading of Display Software through Action on Display Device]

Figure 12A:
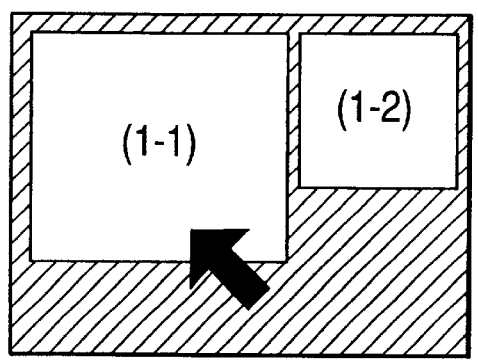
FIGS. 12A and 12B show the display screen of a display control system.
Figure 12B:
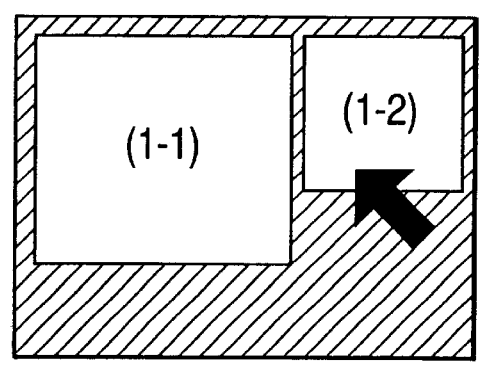

Next, the operation of a function of automatically loading a display software on the image source side will be described with reference to FIGS. 12A and 12B and the flow charts of FIGS. 3 to 18 and FIGS. 27 to 32. The multiwindow display system of the embodiment display system is provided with this automatic loading function.

First, a user moves the main pointer to the image of the image source 1-1 by using the joy stick 24 of the remote controller 21 and depresses the button 25 to select the image of the image source 1-1. If the time while the button is depressed is a predetermined time (e.g., 1 second) or longer, the control portion 6 controls the bus interface 4-1 to stop the update of the image of the image source 1-1 (process R0 (r0-1) shown in FIG. 13 and process R1 (r1-3 to r1-8) shown in FIG. 14). This operation state is illustrated in FIG. 12A. The control portion 6 therefore enters the "drag state". If the user moves the main pointer to the window for the image source 1-2 while depressing the button 25 and releases the depression of the button 25 (FIG. 12B), then the control portion 6 reads the window area corresponding to the image of the image source 1-1 from the frame memory 9 and stores the read data in the internal RAM of the control portion 6. Thereafter, the control portion 6 instructs the bus interface 4-1 to start again the display update of the window in the non-update state (process R1 (r1-2) shown in FIG. 14 and process R5 (r5-1 to r5-4, r5-8, r5-9) shown in FIG. 18).

The control portion 6 sends a display software loading command to the application of the image source 1-2 over USB serial communications to notify that data is transferred. Thereafter, the control portion reads the data stored in the internal RAM each time by a predetermined amount, and compresses the read data and writes the compressed data into the packet control portion 14-2 to thereby transfer it to the image source 1-2 over USB serial communications (process R5 (r5-10, r5-11) shown in FIG. 18). For this data compression, a general compression algorithm such as JPEG may be used.

The data sent from the packet control portion 14-2 over USB serial communications is read by the application of the image source 1-2. By using the read data, the application recovers and reconfigures the image data which is stored in a disk or memory as a file. After the whole image is stored as the file, the application gives the file name and requests the GUI environment to load the image display application registered in advance, and at the same time supplies the image display application with the saved file name, the save location on the disk, and the like (process A10 (a10-1 to a10-3) shown in FIG. 32). In the above manner, the image display application is automatically loaded at the image source 1-2. Not only by automatically copying the image data of the image source 1-1 designated by the remote controller 21 through drag and drop, but also by automatically loading the display application, the user operating the image source 1-2 can view the image data immediately and process and save the image data.

If a user operating the image source does not wish to use this display software automatic loading function, a mark in a check box w4 of the application shown in FIG. 10 is deleted to stop the automatic loading function.

The descriptions of the display system and the operation of the software of the embodiments have been given heretofore.

As described earlier, although USB is used as a means for the communications between the display system and image source in the above embodiments, the invention is not limited only thereto, but it is obvious that other communications means may also be used from the viewpoint of the characteristic features of the invention. Further, the embodiments use an image source running on the relatively highly sophisticated GUI environment such as Windows including a mouse cursor, a window layout, a cubic button and a text box. However, from the viewpoint of the characteristic features of the invention, the invention is not limited only thereto, but any other GUI environments may be applied if a user can operate the image source by selecting an item displayed on the display screen, such as a GUI environment which provides a simple text operation screen and a simple cursor display.

As described so far, according to the display system of the embodiment, a display position of the second position indication mark to be displayed by the second overlay display means is determined in accordance with the user information supplied via the communications means from the user information input means, relative to one piece of the image information selected by the first position indication mark displayed by the first overlay display means, and an operation of the second overlay display means is controlled in accordance with the determined display position. Accordingly, the display of images to be displayed on a conference/presentation display device can be controlled easily by using at least one image display apparatus.

According to a display system of the embodiment, an operation of the image input means is inhibited in accordance with the user information supplied via the communications means from the user information input means. Accordingly, the display update/non-update of the image information output from each image display apparatus and displayed on the display device can be controlled by using the user information input means of the image display apparatus, and the display of images to be displayed on a conference/presentation display device can be controlled easily by using at least one image display apparatus.

According to the display system of the embodiment, one piece of image information selected by the first position indication mark displayed by the first overlay display means is read from the memory means, and the read one piece of image information is transmitted to at least one image display apparatus via the communications means. Accordingly, one piece of image information selected by the first position indication mark can be read from the memory means storing images to be displayed on the display devices and can be acquired by at least one image display apparatus, and the display of images to be displayed on a conference/presentation display device can be controlled easily by using at least one image display apparatus.

According to the display system of the embodiment, one piece of image information selected by the first position indication mark displayed by the first overlay display means is read from the first memory means and temporarily stored in the second memory means, and the temporarily stored one piece of image information is transmitted to at least one image display apparatus via the communications means. Accordingly, it is possible to easily transfer image information between image display apparatuses, and the display of images to be displayed on a conference/presentation display device can be controlled easily by using at least one image display apparatus.

According to the display system of the embodiment, a display position of the second position indication mark to be displayed by the second overlay display means is input by the display position information input means of the display control apparatus, relative to one piece of the image information selected by the first position indication mark displayed by the first overlay display means, and an operation of the second overlay display means is controlled in accordance with the input display position. It is therefore possible to control the display position of the second position indication mark on the display device corresponding to each image display apparatus, and the display of images to be displayed on a conference/presentation display device can be controlled easily by using at least one image display apparatus.

What is claimed is:

1. A display control apparatus having user information input means and connected via communications means to at least one image source apparatus for outputting image information, the display control apparatus comprising:

image receiving means for receiving image information output from the at least one image source apparatus, the image information including a second position indication mark;

a display device for displaying the received image information;

display control means for displaying a first position indication mark on said display device;

first receiving means for receiving data for instructing movement of the first position indication mark or the second position indication mark output from said user information input means;

selection means for selecting one image source apparatus corresponding to the image information in which the first position indication mark is positioned;

transmitting means for transmitting the data for instructing movement of the second position mark to the one image source apparatus via said communication means;

second receiving means for receiving data for instructing movement of the first position mark via said communication means output from the one image source apparatus; and mark control means for moving the first position indication mark in accordance with the data for instructing movement of the first position indication mark received by said first receiving means or said second receiving means.

2. A display control apparatus according to claim 1, wherein said communication means is bi-directional serial communication means.

3. A display system comprising the display control apparatus according to claim 1 and at least one image source apparatus for outputting image information, said at least one image source apparatus being connected via said communication means to the display control apparatus.

4. A display control apparatus having user information input means and connected via communications means to at least one image source apparatus for outputting image information, the display control apparatus comprising:

image receiving means for receiving image information output from the at least one image source apparatus, the image information includes a second position indication mark;

a display device for displaying the received image information;

display control means for displaying a first position indication mark on said display device;

first receiving means for receiving data for instructing movement of said first position mark or said second position mark output from said user information input means;

mark control means for moving the first position indication mark in accordance with the data for instructing movement of said first position indication mark received by said first receiving means;

selection means for selecting one image source apparatus corresponding to the image information in which the first position indication mark is positioned;

transmitting means for transmitting the data for instructing movement of the second position mark via said communication means to the one image source apparatus;

second receiving means for receiving data for instructing update/non-update of the image information displayed on said display device output from the one image source apparatus; and control means for controlling to update the image information displayed on said display device corresponding to the one image source apparatus which output the data for instructing update/non-update of the image information.

5. A display control apparatus according to claim 4, wherein said communication means is bi-directional serial communication means.

6. A display system comprising the display control apparatus according to claim 4 and at least one image source apparatus for outputting image information, said at least one image source apparatus being connected via said communication means to the display control apparatus.

7. A display control apparatus having user information input means and connected via communications means to first and second image source apparatus for outputting image information, the display control apparatus comprising:

image receiving means for receiving image information output from said first image source apparatus, the image information includes a second position indication mark;

memory means for storing the received image information;

a display device for displaying the received image information stored in said memory means;

display control means for displaying a first position indication mark on said display device;

first receiving means for receiving data for instructing movement of the first position indication mark or the second position indication mark output from said user information input means;

mark control means for moving the first position indication mark in accordance with the data for instructing movement of the first position indication mark received by said first receiving means;

first transmitting means for transmitting the data for instructing movement of the second indication mark via said communication means to said first image source apparatus; and second transmitting means for transmitting the image information stored in said memory means to said second image source apparatus.

8. A display control apparatus according to claim 7, wherein said second image source apparatus has memory means for storing the transmitted image information.

9. A display control apparatus according to claim 7, further comprising inhibition means for inhibiting an operation of said image input means when said second transmitting means reads the image information from said memory means.

10. A display control apparatus according to claim 7, wherein said communication means is bi-directional serial communication means.

11. A display system comprising the display control apparatus according to claim 7 and first and second image source apparatus for outputting image information, said first and second image source apparatus are connected via said communication means to the display control apparatus.

12. A display control apparatus having user information input means and connected via communication means to first and second image source apparatus for outputting image information, the display control apparatus comprising:

image receiving means for receiving image information output from said first image source apparatus;

first memory means for storing the received image information;

a second memory for temporarily storing the image information;

a display device for displaying the received image information stored in said first memory means;

display control means for displaying a first position indication mark on said display device;

first transmitting means for transmitting the data for instructing movement of said second indication mark via said communication means to said first image source apparatus;

second transmitting means for transmitting the image information stored in said first memory means to said second memory means; and third transmitting means for transmitting the image information stored in said second memory means to said second image source apparatus.

13. A display control apparatus according to claim 12, wherein said second image source apparatus has memory means for storing the transmitted image information.

14. A display control apparatus according to claim 12, further comprising inhibition means for inhibiting an operation of said image input means when said third transmitting means reads the image information from said first memory means.

15. A display control apparatus according to claim 12, wherein said communications means is bi-directional serial communications means.

16. A display system comprising the display control apparatus according to claim 12 and first and second image source apparatus for outputting image information, said first and second image source apparatus are connected via said communication means to the display control apparatus.

17. A display control apparatus having user information input means and connected via communication means to at least one image source apparatus for outputting image information, the display control apparatus comprising:

image input means for receiving image information output from said at least one image source apparatus, the image information includes a second position indication mark;

a display device for displaying the received image information;

display control means for displaying a first position indication mark on said display device;

first receiving means for receiving data for instructing movement of the first position indication mark or the second position indication mark output from said user information input means;

selection means for selecting one image source apparatus corresponding to the image information in which the first position indication mark is positioned;

transmitting means for transmitting the data for instructing movement of the second position mark to the one image source apparatus via the communication means; and mark control means for moving the first position indication mark in accordance with the data for instructing movement of the first position indication mark received by said first receiving means.

18. A display control apparatus according to claim 17, wherein said communication means is bi-directional serial communication means.

19. A display system comprising the display control apparatus according to claim 17 and first and second image source apparatus for outputting image information, said first and second image source apparatus are connected via the communication means to the display control apparatus.

20. A display control method for an apparatus having user information input means and connected via communications means to at least one image source apparatus for outputting image information, the display control method comprising the steps of:

receiving image information output from the at least one image source apparatus, the image information including a second position indication mark;

displaying the received image information on a display device;

displaying a first position indication mark on the display device;

receiving data for instructing movement of the first position indication mark or the second position indication mark;

selecting one image source apparatus corresponding to the image information in which the first position indication mark is positioned;

transmitting the data for instructing movement of the second position mark to the one image source apparatus via the communication means;

receiving data for instructing movement of the first position mark via the communication means output from the one image source apparatus; and moving the first position indication mark in accordance with the data for instructing movement of the first position mark.

21. A display control method according to claim 20, wherein the communication means is bi-directional serial communication means.

22. A display control system comprising the steps of the display control method according to claim 20 and the additional step of providing at least one image source apparatus for outputting image information, with the at least one image source apparatus being connected via the communication means to the apparatus.

23. A display control method for an apparatus having user information input means and connected via communication means to at least one image source apparatus for outputting image information, the display control method comprising the steps of:

receiving image information output from the at least one image source apparatus, the image information includes a second position indication mark;

displaying the received image information on a display device;

displaying a first position indication mark on the display device;

receiving data for instructing movement of the first position indication mark or the second position indication mark;

selecting one image source apparatus corresponding to the image information in which the first position indication mark is positioned;

transmitting the data for instructing movement of the second position mark to the one image source apparatus; and moving the first position indication mark in accordance with the data for instructing movement of the first position mark.

24. A display control method according to claim 23, wherein the communication means is bi-directional serial communication means.

25. A display control method comprising the steps of the display control method according to claim 23 and the additional step of providing first and second image source apparatus for outputting image information, with the first and second image source apparatus being connected via the communication means to the apparatus.

* * * * *

UNITED STATES PATENT AND TRADEMARK OFFICE
CERTIFICATE OF CORRECTION

PATENT NO. : 6,538,675 B2
DATED : March 25, 2003
INVENTOR(S) : Shuntaro Aratani et al.

It is certified that error appears in the above-identified patent and that said Letters Patent is hereby corrected as shown below:

Column 2,
Line 22, "in-an" should read -- in an --.

Column 3,
Line 5, "to-an-" should read -- to an --.
Line 45, "PS" should read -- P5 --.

Column 4,
Line 24, "2"." should read -- 2"). --.

Column 15,
Line 6, "be-moved" should read -- be moved --.
Line 15, "on off" should read -- on→off --.
Line 63, "source 11" should read -- source 1-1 --.

Signed and Sealed this

Eighteenth Day of November, 2003

JAMES E. ROGAN
*Director of the United States Patent and Trademark Office*